United States Patent
Zhu et al.

(10) Patent No.: US 12,149,499 B2
(45) Date of Patent: Nov. 19, 2024

(54) METHOD AND APPARATUS, AND SYSTEM FOR OBTAINING INTERNET PROTOCOL (IP) ADDRESS CORRESPONDING TO A DOMAIN NAME

(71) Applicant: HUAWEI TECHNOLOGIES CO., LTD., Guangdong (CN)

(72) Inventors: Fangyuan Zhu, Beijing (CN); Hui Ni, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/896,751

(22) Filed: Aug. 26, 2022

(65) Prior Publication Data

US 2023/0006965 A1  Jan. 5, 2023

Related U.S. Application Data

(63) Continuation of application No. PCT/CN2020/076856, filed on Feb. 26, 2020.

(51) Int. Cl.
*H04L 61/4511* (2022.01)

(52) U.S. Cl.
CPC ................. *H04L 61/4511* (2022.05)

(58) Field of Classification Search
CPC ....... H04L 61/4511; H04L 61/59; H04L 67/51
See application file for complete search history.

(56) References Cited

U.S. PATENT DOCUMENTS

| 2006/0168334 A1* | 7/2006 | Potti | H04L 67/02 709/227 |
| 2007/0022289 A1* | 1/2007 | Alt | H04L 9/3271 713/168 |
| 2007/0121890 A1* | 5/2007 | Li | H04L 65/1095 379/221.13 |
| 2009/0207828 A1* | 8/2009 | Pragada | H04L 67/14 370/338 |

(Continued)

FOREIGN PATENT DOCUMENTS

| CN | 109981316 A | 7/2019 |
| CN | 110048873 A | 7/2019 |

(Continued)

OTHER PUBLICATIONS

Chinatelecom, "pCR 23.748—solution to KI#1, Edge Application Server discovery with LDNS address information," SA WG2 Meeting #S2-136AH, S2-2000597, Jan. 13-17, 2020, Incheon, South Korea, 3 pages.

(Continued)

*Primary Examiner* — Jimmy H Tran
(74) *Attorney, Agent, or Firm* — Fish & Richardson P.C.

(57) ABSTRACT

This application discloses an application discovery method and apparatus, and a system. A session management function network element receives first information from a first network element, and determines second information based on at least the first information and location information of a terminal device. The session management function network element sends the second information to the first network element. The second information is for obtaining a first IP address corresponding to a first domain name.

6 Claims, 19 Drawing Sheets

(56) References Cited

U.S. PATENT DOCUMENTS

| | | | |
|---|---|---|---|
| 2012/0113893 A1* | 5/2012 | Damola | H04L 61/5007 370/328 |
| 2013/0304887 A1* | 11/2013 | Cherian | H04W 8/26 709/223 |
| 2014/0032785 A1* | 1/2014 | Chaudhuri | H04L 67/1001 709/245 |
| 2014/0129728 A1* | 5/2014 | Alex | H04L 61/4511 709/228 |
| 2014/0173134 A1* | 6/2014 | Choquette | H04L 61/4511 709/245 |
| 2014/0280963 A1* | 9/2014 | Burbridge | H04L 47/70 709/226 |
| 2014/0337437 A1* | 11/2014 | Peters, Jr. | H04L 65/1023 709/205 |
| 2015/0244791 A1* | 8/2015 | Sundaram | H04L 67/1021 709/203 |
| 2015/0295882 A1* | 10/2015 | Kaliski, Jr. | H04L 61/4511 709/217 |
| 2016/0036857 A1* | 2/2016 | Foxhoven | G06F 12/0815 726/1 |
| 2018/0139289 A1* | 5/2018 | Huotari | H04L 67/1025 |
| 2018/0192471 A1 | 7/2018 | Li et al. | |
| 2019/0238499 A1* | 8/2019 | Naidu | H04L 61/4511 |
| 2019/0357301 A1 | 11/2019 | Li et al. | |
| 2019/0387458 A1* | 12/2019 | Li | H04W 48/14 |
| 2020/0084633 A1* | 3/2020 | Soliman | H04W 12/068 |
| 2020/0112848 A1* | 4/2020 | Palaniappan | H04W 76/16 |
| 2020/0244743 A1* | 7/2020 | Chauhan | H04L 12/4641 |
| 2020/0252367 A1 | 8/2020 | Yang et al. | |
| 2020/0280822 A1* | 9/2020 | Stammers | H04W 4/02 |
| 2020/0358738 A1* | 11/2020 | Mircescu | H04L 63/1441 |
| 2021/0007166 A1* | 1/2021 | Liao | H04W 48/16 |
| 2021/0092595 A1* | 3/2021 | Ramachandran | H04W 12/037 |
| 2021/0176079 A1* | 6/2021 | Prince | H04L 9/3268 |
| 2021/0288886 A1* | 9/2021 | Örtenblad | H04W 40/02 |
| 2021/0320897 A1* | 10/2021 | Stojanovski | H04W 4/50 |
| 2022/0014595 A1* | 1/2022 | Lee | H04L 67/56 |
| 2022/0174033 A1* | 6/2022 | Ke | H04L 61/4511 |
| 2022/0345442 A1* | 10/2022 | Lee | H04L 61/4511 |
| 2022/0377046 A1* | 11/2022 | Zhang | H04L 67/51 |
| 2022/0394088 A1* | 12/2022 | Salkintzis | H04L 67/1036 |
| 2023/0013720 A1* | 1/2023 | Gupta | H04W 12/08 |
| 2023/0069397 A1* | 3/2023 | El Essaili | H04L 41/5058 |
| 2023/0354149 A1* | 11/2023 | Xu | H04L 61/4511 |
| 2023/0396582 A1* | 12/2023 | Roy | H04L 67/1021 |
| 2024/0022540 A1* | 1/2024 | Ke | H04L 61/4511 |
| 2024/0171632 A1* | 5/2024 | Salkintzis | H04L 67/52 |

FOREIGN PATENT DOCUMENTS

| | | |
|---|---|---|
| CN | 110098947 A | 8/2019 |
| CN | 110547003 A | 12/2019 |
| WO | 2012063100 A1 | 5/2012 |
| WO | 2015127958 A1 | 9/2015 |
| WO | 2019137207 A1 | 7/2019 |

OTHER PUBLICATIONS

3GPP TR 23.748 V0.3.0, "3rd Generation Partnership Project; Technical Specification Group Services and System Aspects; Study on enhancement of support for Edge Computing in 5G Core network (5GC) (Release 17)," Jan. 2020, 40 pages.

Extended European Search Report in European Appln No. 20921328.9, dated Feb. 28, 2023, 8 pages.

3GPP TS 23.501 V16.3.0 (Dec. 2019), "3rd Generation Partnership Project; Technical Specification Group Services and System Aspects; System Architecture for the 5G System (5GS); Stage 2 (Release 16)," Dec. 2019, 417 pages.

3GPP TS 23.502 V16.3.0 (Dec. 2019), "3rd Generation Partnership Project; Technical Specification Group Services and System Aspects; Procedures for the 5G System (5GS); Stage 2 (Release 16)," Dec. 2019, 558 pages.

Contavalli et al., "Client Subnet in DNS Queries," Internet Engineering Task Force (IETF), Request for Comments: 7871, May 2016, 30 pages.

Huawei et al., "Solution for the KI#1: Discovery of EAS based on DNS Mechanism," SA WG2 Meeting #136AH, S2-2001554, Incheon, South Korea, Jan. 13-17, 2020, 7 pages.

Huawei, HiSilicon, "Solution for the KI#1: Discovery of Edge Application Server based on DNS Mechanism," SA WG2 Meeting #136, S2-1911170, Reno, USA, Nov. 18-22, 2019, 5 pages.

PCT International Search Report and Written Opinion issued in International Application No. PCT/CN2020/076856 on Nov. 18, 2020, 17 pages (with English translation).

Office Action in Japanese Appln. No. 2022-551368, mailed on Nov. 20, 2023, 17 pages (with English translation).

Huawei et al., "Solution for the KI#1: Discovery of EAS based on DNS mechanism," SA WG2 Meeting #136AH, S2-2000359, Incheon, South Korea, Jan. 13-17, 2020, 6 pages.

Huawei et al., "Solution for the KI#1: Discovery of EAS based on DNS mechanism," SA WG2 Meeting #136AH, S2-2001457, Incheon, South Korea, Jan. 13-17, 2020, 7 pages.

* cited by examiner

METHOD AND APPARATUS, AND SYSTEM FOR OBTAINING INTERNET PROTOCOL (IP) ADDRESS CORRESPONDING TO A DOMAIN NAME

CROSS-REFERENCE TO RELATED APPLICATIONS

This application is a continuation of International Application No. PCT/CN2020/076856, filed on Feb. 26, 2020, the disclosure of which is hereby incorporated by reference in its entirety.

TECHNICAL FIELD

This application relates to the field of communication technologies, and in particular, to an application discovery method and apparatus, and a system.

BACKGROUND

As there are more mobile terminal (for example, mobile phone) users, service functions supported by various mobile terminals keep increasing. For example, functions such as instant messaging, securities, web page browsing, and file download have gradually become mainstream applications on terminal devices, especially smartphones. In an Internet access process, a terminal device needs to query for an Internet protocol (internet protocol, IP) address corresponding to a fully qualified domain name (fully qualified domain name, FQDN), to send a data packet. Usually, the terminal device may send a domain name resolution request to a domain name system (domain name system, DNS) server, where the domain name resolution request carries a domain name that needs to be queried for, and the DNS server returns an IP address corresponding to the domain name, so that the terminal device may access the domain name by using the IP address.

An access network service and an Internet service can be deeply converged by using a mobile edge computing (mobile edge computing, MEC) technology. In the MEC technology, an application server (application server, AS) and some service processing and resource scheduling functions of a mobile broadband (mobile broadband, MBB) core network are deployed at a network edge close to the access network. Services are processed close to users, to provide ultimate service experience with reliability and an ultra-low latency. For example, in a 5th generation (5th generation, 5G) evolution architecture, the terminal device sends the domain name resolution request to the DNS server through a user plane function (user plane function, UPF) network element connected to a MEC platform. However, because application servers deployed on different MEC platforms and providing a same service have a same domain name but different IP addresses, how the DNS server returns an IP address of an application server closer to the terminal device to the terminal device so that the terminal device can access a local service nearby is a problem to be urgently resolved.

SUMMARY

Embodiments of this application provide an application discovery method and apparatus, and a system, to enable a DNS server to return an IP address of an application server closer to a terminal device to the terminal device, so that the terminal device can access a local service nearby.

According to a first aspect, this application provides an application discovery method. The method includes:

A session management function network element receives first information from a first network element. The session management function network element determines second information based on at least the first information and location information of a terminal device. The session management function network element sends the second information to the first network element. The first information includes at least one of a first domain name or an identifier of a first application that corresponds to the first domain name, and the first domain name is sent by the terminal device. The second information is for obtaining a first IP address corresponding to the first domain name.

In the foregoing method, the session management function network element determines the second information based on the location information of the terminal device and the first information sent by the first network element, and sends the second information to the first network element, so that the first network element sends the first IP address to the terminal device after obtaining the first IP address. When the terminal device accesses the first domain name by using the first IP address at a location indicated by the location information of the terminal device, the terminal device can access a local service nearby, so that a service access latency can be short, to ensure high communication efficiency.

In a possible design, the session management function network element determines, based on the first information, the location information of the terminal device, and location information of at least one application platform on which the first application is deployed, a first application platform in the at least one application platform, where the second information corresponds to the first application platform.

In the foregoing design, the session management function network element may determine, based on the location information of the terminal device and the first information, an application platform in the at least one application platform on which the first application is deployed.

In a possible design, the location information of the at least one application platform on which the first application is deployed includes at least one data network access identifier (DNAI) respectively corresponding to the at least one application platform.

In a possible design, the second information includes a data network access identifier (DNAI) corresponding to the first application platform.

In the foregoing design, an application platform closer to the terminal device may be determined, and an IP address of a server that is of the first application and that is deployed on the application platform is further determined as the first IP address corresponding to the first domain name.

In a possible design, the session management function network element determines the second information based on the first application platform and at least one IP address respectively corresponding to the at least one application platform, where the second information includes an IP address corresponding to the first application platform.

In the foregoing design, an application platform closer to the terminal device may be determined, and an IP address of a server that is of the first application and that is deployed on the application platform is further determined as the first IP address corresponding to the first domain name.

In a possible design, the session management function network element determines the second information based on the first application platform and at least one IP address that is of a local domain name system (DNS) server and that respectively corresponds to the at least one application platform, where the second information includes an IP address of a first local DNS server, and the first local DNS server serves the first application platform.

In the foregoing design, the first local DNS server may be determined, so that the first local DNS server determines an application platform closer to the terminal device, and further determines an IP address of a server that is of the first application and that is deployed on the application platform as the first IP address corresponding to the first domain name.

In a possible design, the session management function network element receives third information from the first network element, and the session management function network element selects a local protocol data unit (PDU) session anchor and an uplink classifier (UL CL) or a branching point (BP) for a PDU session of the terminal device based on the third information. The third information includes at least one of a DNAI corresponding to a second application platform on which the first application is deployed, an IP address corresponding to the second application platform on which the first application is deployed, or the first IP address, and the first IP address is an IP address of a server that is of the first application and that is deployed on the second application platform.

In the foregoing design, the session management function network element may select the local PDU session anchor based on the third information, and further select the UL CL or the BP for the PDU session, to implement local steering, optimize a service access path, and improve the communication efficiency.

In a possible design, the first network element is a DNS proxy, an address resolution function network element, or a centralized DNS server.

According to a second aspect, this application provides an application discovery method. The method includes:

A first network element obtains first information. The first network element sends the first information to a session management function network element. The first network element receives second information from the session management function network element. The first network element sends a first IP address to a terminal device. The first information includes at least one of a first domain name or an identifier of a first application that corresponds to the first domain name, and the first domain name is sent by the terminal device. The second information is for obtaining the first IP address corresponding to the first domain name.

In the foregoing method, the first network element sends the first information to the session management function network element, and receives the second information from the session management function network element. The second information is determined based on location information of the terminal device. After obtaining the first IP address, the first network element sends the first IP address to the terminal device. When the terminal device accesses the first domain name by using the first IP address at a location indicated by the location information of the terminal device, the terminal device can access a local service nearby, so that a service access latency can be short, to ensure high communication efficiency.

In a possible design, the second information includes a DNAI corresponding to a first application platform, and at least one application platform on which the first application is deployed includes the first application platform.

In the foregoing design, an application platform closer to the terminal device may be determined, and an IP address of a server that is of the first application and that is deployed on the application platform is further determined as the first IP address corresponding to the first domain name.

In a possible design, the second information includes an IP address corresponding to a first application platform, and at least one application platform on which the first application is deployed includes the first application platform.

In the foregoing design, an application platform closer to the terminal device may be determined, and an IP address of a server that is of the first application and that is deployed on the application platform is further determined as the first IP address corresponding to the first domain name.

In a possible design, the second information includes an IP address of a first local DNS server, the first local DNS server serves a first application platform, and at least one application platform on which the first application is deployed includes the first application platform.

In the foregoing design, the first local DNS server may be determined, so that the first local DNS server determines an application platform closer to the terminal device, and further determines an IP address of a server that is of the first application and that is deployed on the application platform as the first IP address corresponding to the first domain name.

In a possible design, the first network element is a DNS proxy or an address resolution function network element. The first network element sends the second information to a communication peer end. The first network element receives fourth information from the communication peer end, where the fourth information includes the first IP address.

In the foregoing design, the first network element may obtain the first IP address.

In a possible design, the first network element is a centralized DNS server. The first network element determines the first IP address based on the second information.

In the foregoing design, the first network element may obtain the first IP address.

In a possible design, the first network element is a DNS proxy, an address resolution function network element, or a centralized DNS server. The first network element sends, to the first local DNS server, a DNS query request received from the terminal device, where the DNS query request includes the first domain name. The first network element receives fourth information from the first local DNS server, where the fourth information includes the first 1P address.

In the foregoing design, the first network element may obtain the first IP address.

In a possible design, the first network element sends third information to the session management function network element, where the third information includes at least one of a DNAI corresponding to a second application platform on which the first application is deployed, an IP address corresponding to the second application platform on which the first application is deployed, or the first IP address, and the first IP address is an IP address of a server that is of the first application and that is deployed on the second application platform.

In the foregoing design, the session management function network element may select a local PDU session anchor based on the third information, and further select a UL CL or a BP for a PDU session, to implement local steering, optimize a service access path, and improve the communication efficiency.

According to a third aspect, this application provides a communication apparatus. The apparatus may be a session management function network element, or may be a chip in the session management function network element. The apparatus may include a processing unit, a sending unit, and a receiving unit. It should be understood that the sending unit and the receiving unit herein may alternatively be a transceiver unit. When the apparatus is the session management function network element, the processing unit may be a processor, and the sending unit and the receiving unit may be a transceiver. The session management function network element may further include a storage unit, and the storage unit may be a memory. The storage unit is configured to store instructions. The processing unit executes the instructions stored in the storage unit, so that the session management function network element performs the method according to any one of the first aspect or the possible designs of the first aspect. When the apparatus is the chip in the session management function network element, the processing unit may be a processor, and the sending unit and the receiving unit may be input/output interfaces, pins, circuits, or the like. The processing unit executes instructions stored in a storage unit, so that the chip performs the method according to any one of the first aspect or the possible designs of the first aspect. The storage unit is configured to store the instructions. The storage unit may be a storage unit (for example, a register or a cache) inside the chip, or may be a storage unit (for example, a read-only memory or a random access memory) in the session management function network element and outside the chip.

According to a fourth aspect, this application provides a communication apparatus. The apparatus may be a first network element, or may be a chip in the first network element. The apparatus may include a processing unit, a sending unit, and a receiving unit. It should be understood that the sending unit and the receiving unit herein may alternatively be a transceiver unit. When the apparatus is the first network element, the processing unit may be a processor, and the sending unit and the receiving unit may be a transceiver. The first network element may further include a storage unit, and the storage unit may be a memory. The storage unit is configured to store instructions. The processing unit executes the instructions stored in the storage unit, so that the first network element performs the method according to any one of the second aspect or the possible designs of the second aspect. When the apparatus is the chip in the first network element, the processing unit may be a processor, and the sending unit and the receiving unit may be input/output interfaces, pins, circuits, or the like. The processing unit executes instructions stored in a storage unit, so that the chip performs the method according to any one of the second aspect or the possible designs of the second aspect. The storage unit is configured to store the instructions. The storage unit may be a storage unit (for example, a register or a cache) inside the chip, or may be a storage unit (for example, a read-only memory or a random access memory) in the first network element and outside the chip.

According to a fifth aspect, this application further provides a computer-readable storage medium, where the readable storage medium stores instructions; and when the instructions are executed, the method in the first aspect or the second aspect is implemented.

According to a sixth aspect, this application further provides computer program code. When the computer program code is run on a computer, the computer is enabled to perform the method in the first aspect or the second aspect.

According to a seventh aspect, this application further provides a computer program product including a program. When the computer program product runs on a computer, the computer is enabled to perform the method in the first aspect or the second aspect.

According to an eighth aspect, this application further provides a communication apparatus, including a processor and a memory. The memory is configured to store computer-executable instructions, and the processor is configured to execute the computer-executable instructions stored in the memory, to enable the communication apparatus to perform the method in the first aspect or the second aspect.

According to a ninth aspect, this application further provides a communication apparatus, including a processor and an interface circuit. The interface circuit is configured to receive code instructions and transmit the code instructions to the processor, and the processor runs the code instructions to perform the method in the first aspect or the second aspect.

According to a tenth aspect, this application further provides a communication system. The communication system includes a session management function network element and a first network element, where the session management function network element performs the method in the first aspect, and the first network element performs the method in the second aspect.

DESCRIPTION OF EMBODIMENTS

The following describes embodiments of this application in detail with reference to accompanying drawings.

Figure 1:
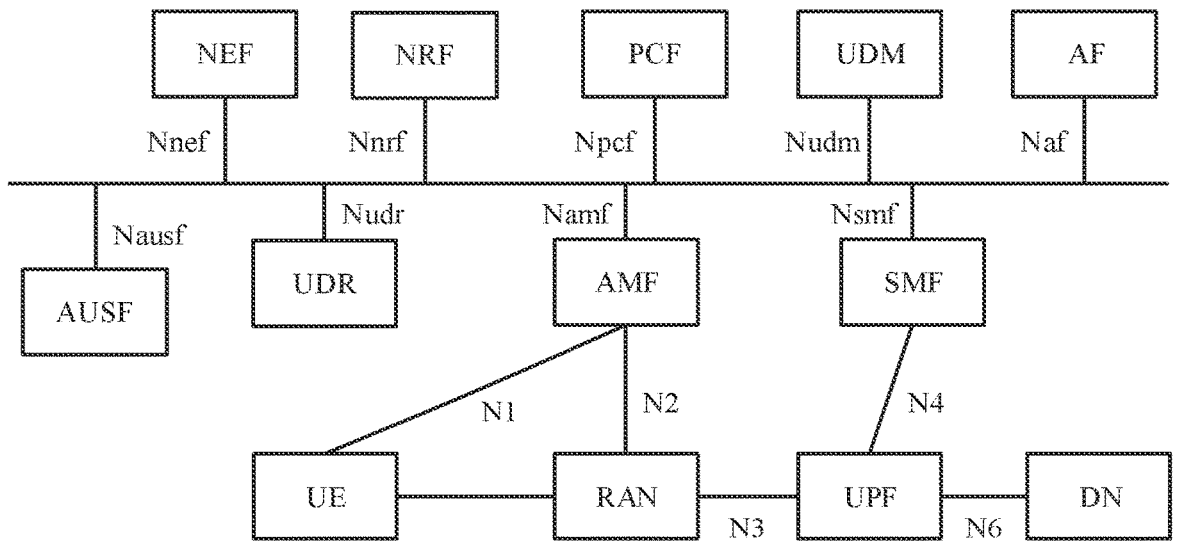
FIG. 1 is a first schematic diagram of a 5G system architecture according to this application.
Figure 2:
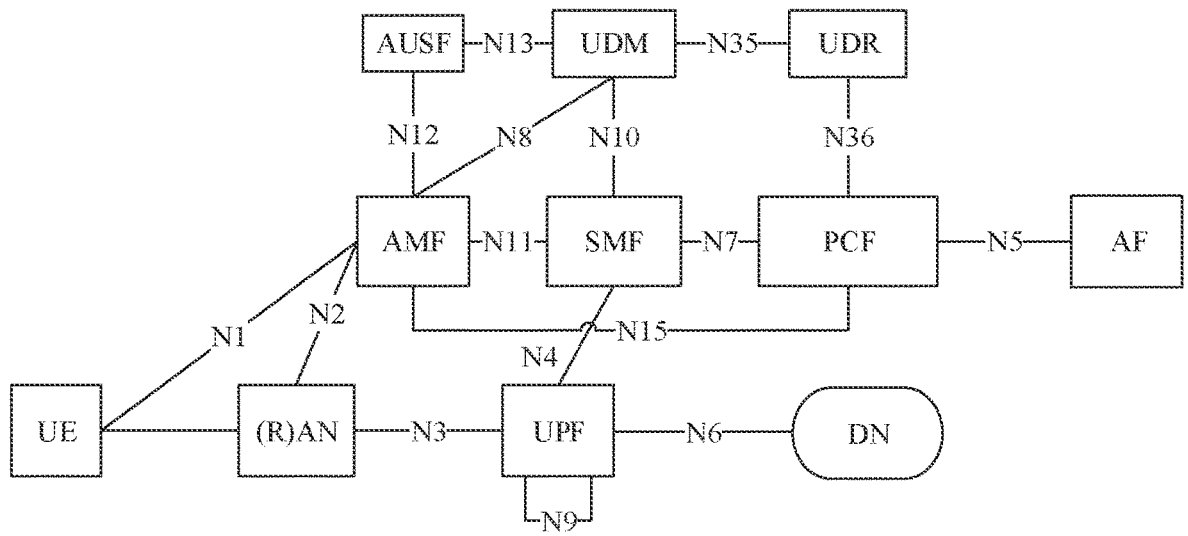
FIG. 2 is a second schematic diagram of a 5G system architecture according to this application.

Embodiments of this application are mainly applied to a 5G system architecture, as shown in FIG. 1 and FIG. 2. FIG. 2 is a schematic diagram of a 5G network architecture that is based on point-to-point interfaces. A main difference between FIG. 1 and FIG. 2 lies in that an interface between network elements in FIG. 2 is a point-to-point interface instead of a service-oriented interface. It should be understood that all the following embodiments shown in FIG. 6 to FIG. 12A and FIG. 12B may be applied to but are not limited to the network architectures shown in FIG. 1 and FIG. 2.

The 5G network architecture may include three parts: a terminal device, a data network (data network, DN), and a carrier network.

The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

The carrier network may include one or more of the following network elements: an authentication server function (authentication server function, AUSF) network element, a network exposure function (network exposure function, NEF) network element, a policy control function (policy control function, PCF) network element, a unified data management (unified data management, UDM) network element, a unified data repository (unified data repository, UDR), a network repository function (network repository function, NRF) network element, an application function (application function, AF) network element, an access and mobility management function (access and mobility management function, AMF) network element, a session management function (session management function, SMF) network element, a radio access network (radio access network, RAN), a user plane function (user plane function, UPF) network element, and the like. In the foregoing carrier network, parts other than the radio access network may be referred to as a core network.

The RAN is configured to implement radio access-related functions.

The AMF network element is configured to implement mobility management functions, and is responsible for user mobility management, including mobility status management, temporary user identity allocation, and user authentication and authorization.

The SMF network element is configured to implement session management functions, and is responsible for UPF network element selection, UPF network element reselection, IP address assignment, bearer establishment, modification, and release, and quality of service (quality of service, QoS) control.

The PCF network element has functions of policy control decision and flow-based charging control, and the functions include a user subscription data management function, a policy control function, a charging policy control function, QoS control, and the like.

The UDM network element is responsible for managing subscription data, and is responsible for notifying a corresponding network element when the subscription data is modified.

The UDR is configured to store and retrieve the subscription data, policy data, common architecture data, and the like, so that the UDM network element, the PCF network element, and the NEF network element obtain related data. The UDR can provide different data access authentication mechanisms for different types of data (such as the subscription data and the policy data), to ensure data access security. For an unauthorized service-oriented operation or data access request, the UDR can return a failure response carrying an appropriate cause value.

The AF network element is configured to provide an application-layer service to the UE. When providing the service to the UE, the AF has requirements on a QoS policy and a charging (charging) policy, and needs to notify a network. In addition, the AF also requires application-related information fed back from the core network.

The NEF network element mainly supports a network capability exposure function, and externally exposes network capabilities and services. A 3GPP network function (network function, NF) publishes a function and an event to another NF through the NEF. The capability and the event that are exposed by the NF may be securely exposed to a third-party application. The NEF stores or retrieves structured data by using a standard interface (Nudr) of the UDR, and translates exchanged information of the AF and exchanged information of an internal network function. For example, the NEF performs conversion between an AF service identifier (AF-Service-Identifier) and internal 5G core information (for example, a data network name (data network name, DNN) and single network slice selection assistance information (single network slice selection assistance information, S-NSSAI)).

The UPF (User Plane Function) network element may support all or a part of the following functions: interconnecting a protocol data unit (protocol data unit, PDU) session with the data network, packet routing and forwarding (for example, supporting forwarding traffic to the data network after the traffic passes through an uplink classifier (uplink classifier, UL CL), and supporting a branching point (branching point, BP) to support a multi-homed (multi-homed) PDU session), and data packet detection.

In addition, network elements in embodiments of this application further include a DNS proxy (proxy), an address resolution function (address resolution function, ARF) network element, and a DNS server (server).

The DNS proxy means enabling a DNS proxy function on a firewall. In this way, when no DNS server is available in a local area network, a client in the local area network may be connected to an external DNS server through the firewall, so that the external DNS server performs correct DNS resolution to implement Internet (internet) access.

A working mechanism of the DNS proxy is as follows: A DNS client sends a DNS request packet to the DNS proxy. In this case, a destination address in the packet is an IP address of the DNS proxy. After receiving the packet, the DNS proxy replaces the destination address in the packet with an IP address of a DNS server, and then forwards the packet to the DNS server based on the configured address of the DNS server. If addresses of a plurality of DNS servers are configured on the DNS proxy, the DNS proxy first sends the packet to the first DNS server. If the first DNS server makes no response, the DNS client resends the DNS request packet after wait duration expires. After receiving the resent DNS request packet, the DNS proxy forwards the DNS request packet to the second DNS server. The rest can be deduced by analogy until a DNS server sends a response packet.

The DNS server is responsible for resolving a domain name to an IP address. For example, a client sends a domain name query request to the DNS server, and the DNS server returns an IP address corresponding to a domain name, so that the terminal device can access the domain name by using the IP address.

The address resolution function network element can support the functions of both the DNS proxy and the DNS server, or support the function of only the DNS proxy or the DNS server.

It should be understood that the descriptions of the functions of the foregoing network elements are not intended to limit this application.

Figure 3:
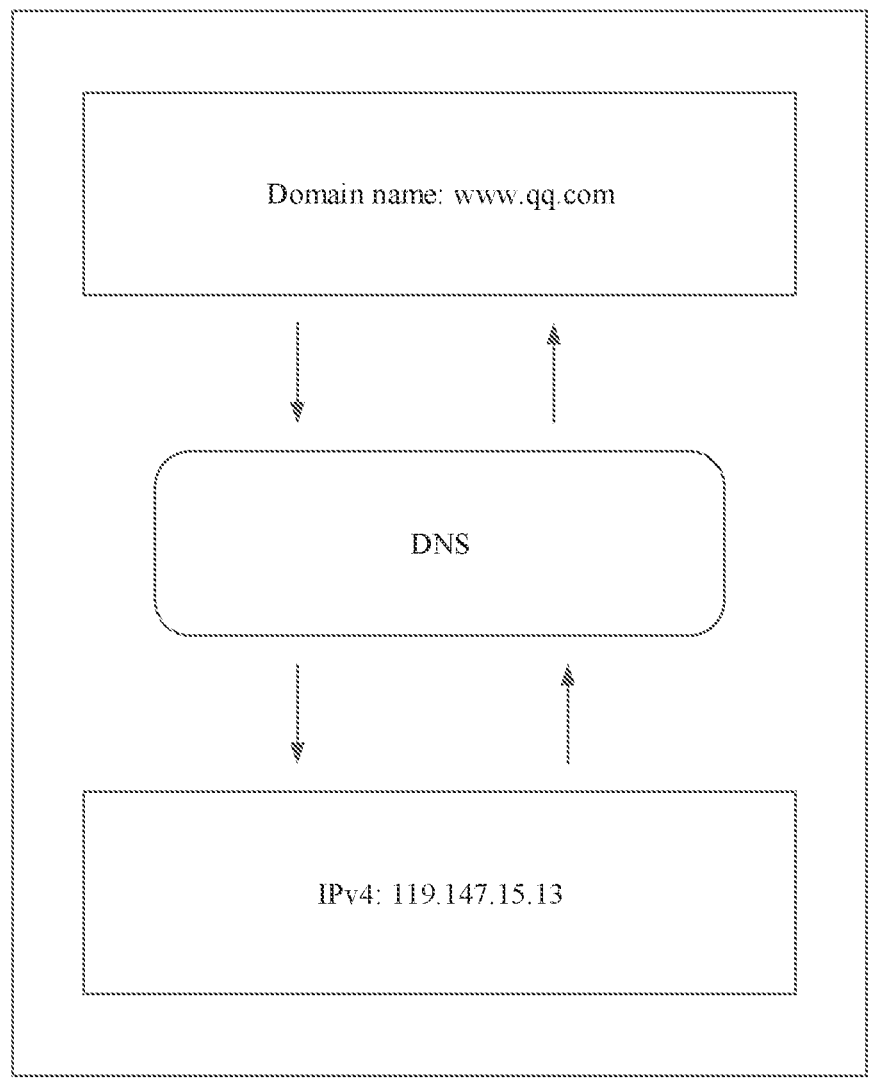
FIG. 3 is a schematic diagram of domain name access according to this application.

The following briefly describes an existing domain name access process:

As shown in FIG. 3, currently, the domain name access process is as follows: Using an example in which a terminal device accesses a domain name A (for example, www.qq.com), when accessing the domain name A, the terminal device queries whether an IP address corresponding to the domain name A exists in a cache of the terminal device. If the IP address exists, the terminal device may directly obtain the IP address, and access the domain name A by using the IP address. If the IP address does not exist, the terminal device may send a domain name resolution request to a DNS server, where the domain name resolution request carries the domain name A. The DNS server returns the IP address corresponding to the domain name A, and the terminal device may access the domain name A by using the 1P address.

In addition, after obtaining the IP address corresponding to the domain name A, the terminal device generates and caches a DNS cache record. The DNS cache record represents a correspondence between the domain name A and the IP address. The terminal device further maintains a corresponding time to live (time to live, TTL) for the DNS cache record. The TTL of the DNS cache record is a time period for which the DNS cache record is stored in the cache of the terminal device. In this way, when the terminal device needs to access the domain name A in the DNS cache record again within the TTL of the DNS cache record, the terminal device may directly obtain, based on the DNS cache record, the IP address corresponding to the domain name A. After the TTL of the DNS cache record expires, the terminal device needs to obtain, via the DNS server through the foregoing process, the IP address corresponding to the domain name A.

Figure 4:
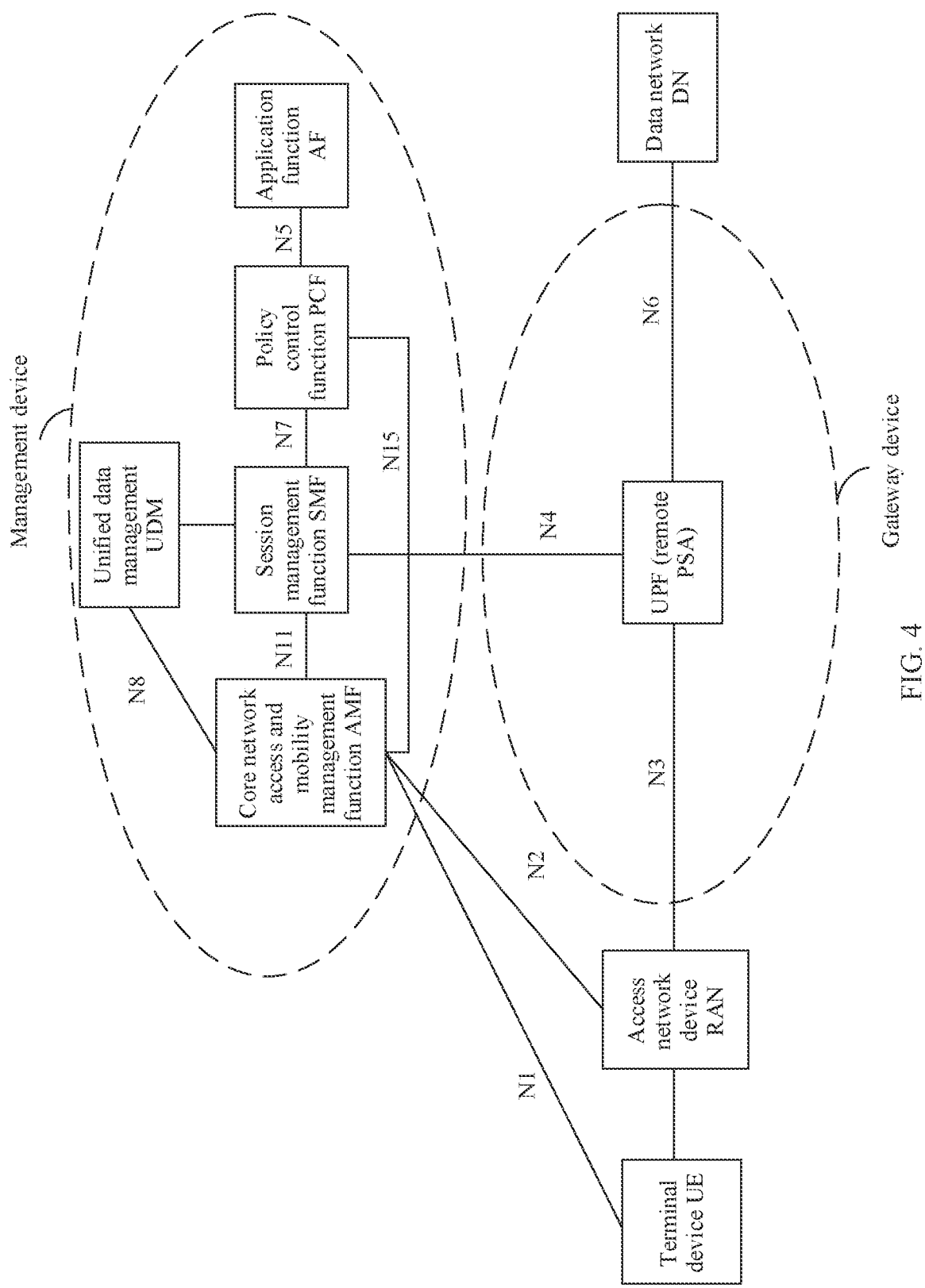
FIG. 4 is a schematic diagram of a PDU session establishment process according to this application.
Figure 5:
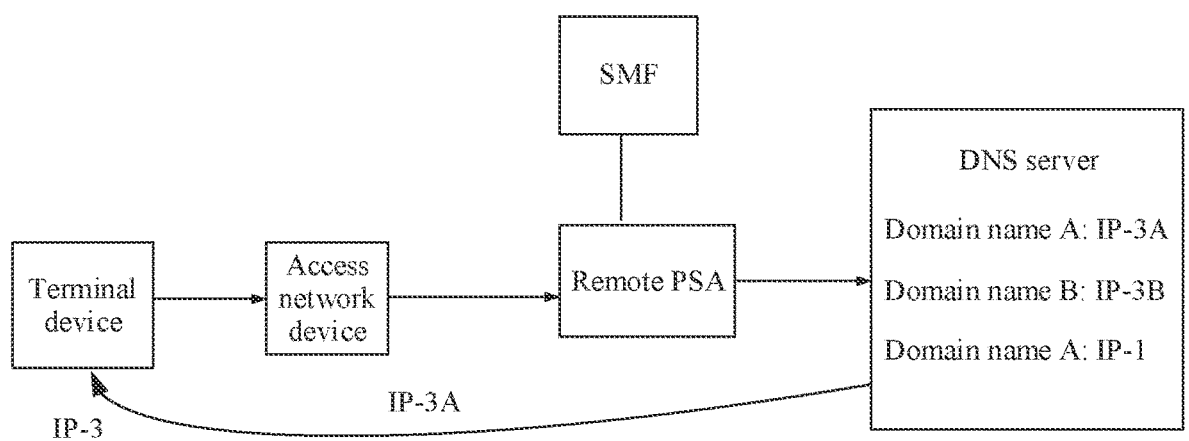
FIG. 5 is a schematic diagram in which a terminal device requests, after initial PDU session establishment is completed, an IP address corresponding to a domain name according to this application.

As shown in FIG. 4, in an initial PDU session establishment process, to select an optimal anchor UPF, a core network selects a PDU session anchor (PDU session anchor, PSA) with reference to a location of a terminal device. However, due to mobility of the terminal device, a location of a remote PSA (namely, the PSA selected in the initial PDU session establishment process) cannot represent a current physical location of the terminal device. Based on FIG. 4, FIG. 5 is a schematic diagram in which the terminal device requests, after the initial PDU session establishment is completed, an IP address corresponding to a domain name. As shown in FIG. 5, it is assumed that an address assigned by the core network to the terminal device in the initial PDU session establishment process is IP-3. When the terminal device requests, via the remote PSA, a DNS server to query for a domain name A, the remote PSA sends a DNS query request of the terminal device to the DNS server. The domain name A may correspond to a plurality of application servers deployed in different locations. For example, the application servers corresponding to the domain name A are deployed on two different MEC platforms: an MEC platform-1 and an MEC platform-2. IP addresses of the two application servers are IP-3A and IP-1. The application server whose IP address is the IP-3A is deployed on the MEC platform-1, and the application server whose IP address is the IP-1 is deployed on the MEC platform-2. A deployment location of the MEC platform-1 is closer to the remote PSA, and is farther from the current location of the terminal device. A deployment location of the MEC platform-2 is farther from the remote PSA, and is closer to the current location of the terminal device. Because the DNS server is unaware of the current location of the terminal device, after receiving, from the remote PSA, the DNS query request from the terminal device, the DNS server returns, based on address affinity and the requested domain name A, an IP address of an application server closer to the remote PSA. Therefore, the DNS server returns the address (for example, the IP-3A in FIG. 5) of the application server deployed on the MEC platform-1. In this case, the terminal device cannot obtain the IP address of the application server deployed on the MEC platform-2, and consequently cannot access a service nearby through the application server deployed on the MEC platform-2. In addition, because the terminal device accesses the service via a remote application server, a latency in accessing the service by the terminal device is increased, and communication efficiency is reduced.

It should be understood that embodiments of this application are also applicable to another future-oriented communication technology. The network architectures and service scenarios described in this application are intended to describe technical solutions in this application more clearly, and do not constitute a limitation on the technical solutions provided in this application. A person of ordinary skill in the art may learn that: With evolution of the network architectures and emergence of new service scenarios, the technical solutions provided in this application are also applicable to similar technical problems.

An embodiment of this application provides an application discovery method. The method enables a DNS server to return an IP address of an application server closer to a terminal device to the terminal device, so that the terminal device can access a local service nearby. In addition, according to the method provided in this embodiment of this application, after the DNS server returns the IP address of the application server closer to the terminal device to the terminal device, service traffic can be selectively routed to an application platform on which the application server is deployed.

Figure 6:
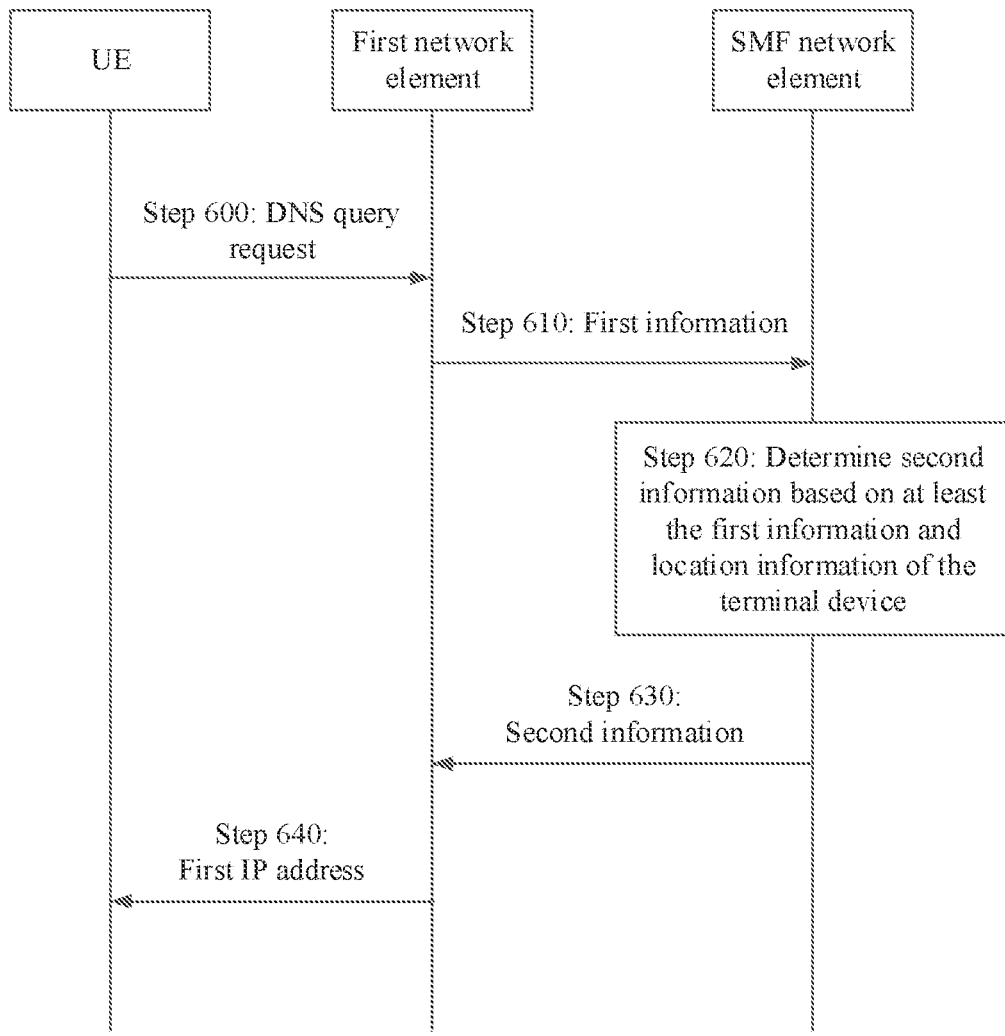
FIG. 6 is a flowchart of an application discovery method according to this application.

As shown in FIG. 6, the method includes the following steps.

Step 600: The terminal device sends a DNS query request to a first network element.

The DNS query request may also be referred to as a domain name resolution request, and includes a first domain name.

Step 610: The first network element sends first information to an SMF network element, where the first information includes at least one of the first domain name or an identifier of a first application that corresponds to the first domain name, and the first domain name is sent by the terminal device, namely, the domain name included in the DNS query request in step 600.

In an example, the first network element is a DNS proxy, an ARF, or a centralized DNS server, and the first network element receives the DNS query request from the terminal device, where the DNS query request includes the first domain name. In this case, the first network element may send the first information to the SMF network element through a NEF network element, where the first information includes the identifier of the first application that corresponds to the first domain name, or includes the first domain name and the identifier of the first application that corresponds to the first domain name. The first network element may store a correspondence between a domain name and an identifier of an application, to determine, based on the first domain name, the identifier of the first application that corresponds to the first domain name. For example, an AF network element may configure the correspondence for the first network element.

It should be understood that, how the first network element sends the first information to the SMF network element through the NEF network element is described below by using only an example in which the first information includes the identifier of the first application that corresponds to the first domain name. This constitutes no limitation on this application.

The first network element sends a request message to the NEF network element, where the request message carries the identifier of the first application and an IP address of the terminal device. For example, the request message may be an application location request (Nsmf_ApplicationLocation_Request). The NEF network element determines an ID of the terminal device based on the IP address of the terminal device, and determines, based on the ID of the terminal device, an SMF network element serving the terminal device. For example, the ID of the terminal device may be a permanent identifier (subscription Permanent Identifier, SUPI) of the terminal device. The NEF network element sends a request message to the SMF network element serving the terminal device, where the request message carries the identifier of the first application and the ID of the terminal device. For example, the request message may be an application location request.

In another example, the first network element is a DNS proxy, an ARF, or a centralized DNS server, and the first network element receives the DNS query request from the terminal device, where the DNS query request includes the first domain name. In this case, the first network element may send the first information to the SMF network element through a NEF network element, where the first information includes the first domain name. The SMF network element may store a correspondence between a domain name and an identifier of an application, to determine, based on the first domain name, the identifier of the first application that corresponds to the first domain name. For a specific procedure in which the first network element sends the first information to the SMF network element through the NEF network element, refer to the previous example. Details are not described herein again.

It should be noted that the DNS proxy or the ARF may be deployed as an independent network element, or may be integrated with the NEF network element, the AF network element, or another network element in deployment. Therefore, when the DNS proxy or the ARF is integrated with the NEF network element in deployment, the SMF network element may directly interact with the DNS proxy.

Step 620: The SMF network element determines second information based on at least the first information and location information of the terminal device.

In a possible design, the SMF network element determines, based on the first information, the location information of the terminal device, and location information of at least one application platform on which the first application is deployed, a first application platform in the at least one application platform on which the first application is deployed. It should be understood that the at least one application platform on which the first application is deployed indicates that there is one or more application platforms, and a server of the first application is deployed on these application platforms.

The location information of the terminal device may be a tracking area identity (tracking area identity, TAI) of the terminal device.

An implementation method used by the SMF network element to obtain the location information of the terminal device is that the SMF network element may obtain the location information of the terminal device from another network element. For example, the SMF network element may obtain the TAI of the terminal device from an AMF network element. In addition, the SMF network element may request the TAI of the terminal device from the AMF network element. When a location of the terminal device changes, the AMF network element may provide a current latest TAI of the terminal device to the SMF network element, so that the SMF network element can determine the location information of the terminal device based on the current latest TAI of the terminal device.

The location information of the at least one application platform on which the first application is deployed may also be described as location information of the at least one application platform on which the server of the first application is deployed. The application platform herein may be a MEC platform, which may also be referred to as a management platform or an application management platform. This is not limited in this application.

An implementation method used by the SMF network element to obtain the location information of the at least one application platform on which the first application is deployed is that the SMF network element may locally configure the location information of the at least one application platform on which the first application is deployed. Another implementation method is that the SMF network element obtains, from another network element, the location information of the at least one application platform on which the first application is deployed. For example, the SMF network element obtains, from a PCF network element or the NEF network element, the location information of the at least one application platform on which the first application is deployed, where the PCF network element or the NEF network element stores the location information of the at least one application platform on which the first application is deployed.

It may be understood that based on the foregoing three pieces of information, the SMF network element may determine, in the at least one application platform on which the first application is deployed, at least one application platform, namely, the first application platform, that is closer to the terminal device. The server of the first application is deployed on the first application platform, and there may be one or more first application platforms. This is not limited in this application.

It may be understood that the first application platform is an application platform on which the server that is of the first application and that is accessed by the terminal device at a current location through an optimal path is located. In other words, when the terminal device sends a data packet to the server that is of the first application and that is deployed on the first application platform, a routing path of the data packet is an optimal path in a current network topology condition. When the terminal device accesses the server of the first application at the current location through the optimal path, if the server of the first application is deployed on a plurality of application platforms, there are a plurality of first application platforms.

It should be understood that the SMF network element may alternatively determine, in the at least one application platform on which the first application is deployed, the first application platform with reference to other information such as load information of the application platform and network topology information. This is not limited in this application. For example, the SMF network element determines, based on the first information, the location information of the terminal device, and the location information of the at least one application platform on which the first application is deployed, a plurality of application platforms in the at least one application platform on which the first application is deployed. The SMF network element further determines, with reference to load information corresponding to the plurality of application platforms, an application platform with lowest load as the first application platform.

For example, the location information of the at least one application platform on which the first application is deployed may include at least one data network access identifier (DN Access Identifier, DNAI) respectively corresponding to the at least one application platform on which the first application is deployed. For example, if the first information includes an FQDN-A, the location information of the at least one application platform on which the first application is deployed may be as shown in Table 1. If the first information includes an APP ID-1, the location information of the at least one application platform on which the first application is deployed may be as shown in Table 2. If the first information includes an FQDN-A and an APP ID-1, the location information of the at least one application platform on which the first application is deployed may be as shown in Table 1, Table 2, or Table 3.

TABLE 1

| Domain name | DNAI list (list) |
| --- | --- |
| FQDN-A | DNAI 1 (MEC platform-1) |
| | DNAI 2 (MEC platform-2) |

TABLE 2

| APP ID | DNAI list |
| --- | --- |
| APP ID-1 | DNAI 1 (MEC platform-1) |
| | DNAI 2 (MEC platform-2) |

TABLE 3

| Domain name | APP ID | DNAI list |
| --- | --- | --- |
| FQDN-A | APP ID-1 | DNAI 1 (MEC platform-1) |
| | | DNAI 2 (MEC platform-2) |

In an example, if the location information of the at least one application platform on which the first application is deployed is the at least one DNAI respectively corresponding to the at least one application platform on which the first application is deployed, the SMF network element may determine, in the at least one application platform on which the first application is deployed, at least one first application platform based on the first information, the at least one DNAI respectively corresponding to the at least one application platform on which the first application is deployed, and the location information, such as the TAI, of the terminal device. The at least one DNAI respectively corresponding to the at least one application platform may alternatively be specifically indicated by a DNAI list, where the DNAI list includes at least one DNAI. Specifically, there may be a mapping relationship or a correspondence between the location information of the terminal device and the at least one DNAI respectively corresponding to the at least one application platform on which the first application is deployed. The SMF network element may determine, based on the location information of the terminal device, the at least one first application platform in the at least one application platform on which the first application is deployed.

Based on this, the SMF network element may determine the second information in manners including but not limited to the following three manners.

Manner 1:

The SMF network element determines the first application platform in the at least one application platform based on the first information, the location information of the terminal device, and the at least one DNAI respectively corresponding to the at least one application platform on which the first application is deployed. Because there is a correspondence between an application platform and a DNAI corresponding to the application platform, after determining the first application platform, the SMF network element may obtain a DNAI corresponding to the first application platform as the second information. For example, if the first information includes the FQDN-A, and the location information of the at least one application platform on which the first application is deployed may be as shown in Table 1, when the first application platform is the MEC platform-1, the second information includes the DNAI 1.

It may be understood that a DNAI corresponding to an application platform may represent location information of the application platform. Therefore, when obtaining the DNAI corresponding to the first application platform, the first network element obtains location information of the first application platform.

Manner 2:

The SMF network element determines the first application platform in the at least one application platform based on the first information, the location information of the terminal device, and the location information of the at least one application platform on which the first application is deployed. Further, because there is a correspondence between an application platform and an IP address corresponding to the application platform, after determining the first application platform, the SMF network element determines, based on at least one IP address respectively corresponding to the at least one application platform on which the first application is deployed, an IP address corresponding to the first application platform as the second information.

According to existing extension mechanisms for DNS (Extension Mechanisms for DNS, EDNS), an EDNS client subnet option (ECS (EDNS Client Subnet) option) may be added to a DNS query request, and the ECS option includes an IP address of a client, so that a DNS server better determines, based on the IP address of the client, an IP address corresponding to a domain name that the client requests to query for. In this application, because the IP address of the terminal device cannot reflect the location of the terminal device, the first network element needs to request the SMF network element to obtain the second information, where the second information may be added as an ECS option to the DNS query request, so that the DNS server better determines, based on the ECS option, an IP address corresponding to the first domain name that the terminal device requests to query for.

An IP address corresponding to an application platform is an IP address required on a routing path when a network element device in a network accesses the application platform or an IP address required on a communication path when a network element device in a network communicates with the application platform.

For example, an IP address corresponding to an application platform may be a public IP address required for accessing the application platform. For example, the public IP address is any public IP address in a public IP address space at an entrance of the application platform.

For example, an IP address corresponding to an application platform may be a subnet (subnet) IP address or a full IP address (full IP address) required for accessing the application platform. For example, the subnet IP address is a subnet or full IP address that points to the application platform after a UPF network element performs network address translation (Network address translation, NAT) when accessing the application platform over an N6 interface, where the subnet or full IP address is referred to as a subnet IP address (or full IP address) after NAT. It may be understood that an IP address corresponding to an application platform may represent location information of the application platform. Therefore, when obtaining the IP address corresponding to the first application platform, the first network element obtains location information of the first application platform.

For example, the location information of the at least one application platform on which the first application is deployed includes the at least one DNAI respectively corresponding to the at least one application platform on which the first application is deployed, and the at least one IP address respectively corresponding to the at least one application platform on which the first application is deployed is at least one IP address respectively corresponding to the at least one DNAI respectively corresponding to the at least one application platform on which the first application is deployed. In other words, the at least one application platform on which the first application is deployed is represented by the corresponding DNAI. For example, the location information of the at least one application platform on which the first application is deployed is as shown in Table 1, and the at least one IP address respectively corresponding to the at least one application platform on which the first application is deployed is as shown in Table 4. When the first application platform is the MEC platform-1, the second information includes IP-1.

TABLE 4

| DNAI list | EDNS client subnet (ECS) option |
|---|---|
| DNAI 1 (MEC platform-1) | IP-1 |
| DNAI 2 (MEC platform-2) | IP-2 |

Manner 3:

The SMF network element determines the first application platform in the at least one application platform based on the first information, the location information of the terminal device, and the location information of the at least one application platform on which the first application is deployed. Further, because there is a correspondence between an application platform and an IP address that is of a local DNS server and that corresponds to the application platform, after determining the first application platform, the SMF network element determines an IP address of a first local DNS server as the second information based on at least one IP address that is of a local DNS server and that respectively corresponds to the at least one application platform on which the first application is deployed, where the first local DNS server serves the first application platform.

The local DNS server may be understood as a DNS server located in a local data center. The local DNS server is mainly responsible for performing domain name resolution on an application deployed on a local application platform or the MEC platform. When the at least one application platform on which the first application is deployed includes the local application platform or the MEC platform, a DNS server that serves the local application platform or the MEC platform may be referred to as the local DNS server, and the local DNS server performs domain name resolution on the application deployed on the local application platform or the MEC platform. In this application, the first application platform may be understood as the local application platform or the MEC platform. In this case, a local DNS server that serves the first application platform is referred to as the first local DNS server. In addition, if the at least one application platform on which the first application is deployed includes a plurality of local application platforms or a plurality of MEC platforms, there may be a plurality of local DNS servers serving the local application platforms or the MEC platforms. It may be understood that if there are a plurality of first application platforms, and there are also a plurality of local DNS servers respectively corresponding to the plurality of first application platforms, the SMF network element may select one local DNS server as the first local DNS server according to a local policy. In an implementation, the SMF network element uses a local DNS server with lower load as the first local DNS server based on a load status of each of the plurality of local DNS servers. In another implementation, the SMF network element uses, based on a domain name query list supported by each of the plurality of local DNS servers, a local DNS server that supports a larger quantity of domain name query lists as the first local DNS server.

For example, the location information of the at least one application platform on which the first application is deployed includes the at least one DNAI respectively corresponding to the at least one application platform on which the first application is deployed, and the at least one IP address that is of the local DNS server and that respectively corresponds to the at least one application platform on which the first application is deployed is at least one IP address that is of the local DNS server and that respectively corresponds to the at least one DNAI respectively corresponding to the at least one application platform on which the first application is deployed. In other words, the at least one application platform on which the first application is deployed is represented by the corresponding DNAI. For example, the location information of the at least one application platform on which the first application is deployed is as shown in Table 2, and the at least one IP address that is of the local DNS server and that respectively corresponds to the at least one application platform on which the first application is deployed is as shown in Table 5. When the first application platform is the MEC platform-1, the second information includes local DNS server IP-1.

TABLE 5

| DNAI list | IP address for local DNS server (IP address of a local DNS server) |
|---|---|
| DNAI 1 (MEC platform-1) | local DNS server IP-1 |
| DNAI 2 (MEC platform-2) | local DNS server IP-2 |

It should be understood that the foregoing examples are not intended to limit this application.

Step 630: The SMF network element sends the second information to the first network element, where the second information is for obtaining a first IP address corresponding to the first domain name.

For example, the SMF network element sends a response message to the first network element through the NEF network element, where the response message includes the second information.

After receiving the first information from the first network element, the SMF network element determines the second information based on at least the first information and the location information of the terminal device. Because the second information is determined based on the location information of the terminal device, the second information is for obtaining, when the terminal device is at a location indicated by the location information, the first IP address corresponding to the first domain name, and the terminal device accesses the first domain name by using the first IP address when the terminal device is at the location indicated by the location information, so that the terminal device can access a local service nearby.

Step 640: The first network element sends the first IP address to the terminal device.

After the first network element receives the second information sent by the SMF network element, with reference to step 620, because content included in the second information varies, the first network element may obtain the first IP address by using possible designs including but not limited to the following three possible designs.

In a first possible design, if the second information includes the DNAI corresponding to the first application platform or the IP address corresponding to the first application platform, and the first network element is the DNS proxy or the ARF, the first network element sends the second information to a communication peer end. The first network element receives fourth information from the communication peer end, where the fourth information includes the first IP address.

In a second possible design, if the second information includes the DNAI corresponding to the first application platform or the IP address corresponding to the first application platform, and the first network element is the centralized DNS server, the first network element determines the first IP address based on the second information.

In a third possible design, if the second information includes the IP address of the first local DNS server, and the first network element is the DNS proxy, the ARF, or the centralized DNS server, the first network element sends, to the first local DNS server, the DNS query request received from the terminal device, where the DNS query request includes the first domain name. The first network element receives fourth information from the first local DNS server, where the fourth information includes the first IP address.

The following describes the foregoing possible designs with reference to specific examples.

Example 1: The second information includes the DNAI corresponding to the first application platform, and the first network element is the DNS proxy. Specifically, in the following, a DNAI list may represent the second information, and the DNAI list includes the DNAI corresponding to the first application platform. The DNS proxy determines, based on the correspondence between the at least one DNAI respectively corresponding to the at least one application platform on which the first application is deployed and the at least one IP address respectively corresponding to the at least one application platform on which the first application is deployed, the 1P address corresponding to the first application platform, and adds, as an ECS option list, the IP address corresponding to the first application platform to a DNS request message. The ECS option list includes one or more ECS options, and each ECS option includes the IP address corresponding to the first application platform. If there are a plurality of first application platforms, there are also a plurality of IP addresses corresponding to the plurality of first application platforms. The DNS proxy adds, as the ECS option list, the IP addresses respectively corresponding to the plurality of application platforms to the DNS request message. If a destination address in the DNS query request is an address of the DNS proxy, the DNS proxy sends the DNS request message including the ECS option list to the centralized DNS server based on a configured address of the centralized DNS server. If a destination address in the DNS query request is an address of the centralized DNS server, the DNS proxy sends the DNS request message including the ECS option list to the centralized DNS server. The centralized DNS server determines, based on the first domain name and the ECS option list that are included in the DNS query request, an application platform to which the IP address in the ECS option list points, and further determines an IP address of a server that is of the first application and that is deployed on the application platform, namely, the first IP address. The centralized DNS server supports the first domain name. The centralized DNS server sends a DNS response message to the DNS proxy, where the DNS response message includes the first IP address. The DNS proxy sends a DNS response message to the terminal device, where the DNS response message includes the first IP address.

In addition, when there are a plurality of first application platforms, the DNAI list includes a plurality of DNAIs, and the DNS proxy determines the ECS option list based on the correspondence between the at least one DNAI respectively corresponding to the at least one application platform on which the first application is deployed and the at least one IP address respectively corresponding to the at least one application platform on which the first application is deployed, where the ECS option list includes IP addresses respectively corresponding to the plurality of DNAIs. The centralized DNS server determines a target ECS option based on the first domain name and the ECS option list, determines an application platform to which an IP address corresponding to the target ECS option points, and further determines an IP address of a server that is of the first application and that is deployed on the application platform as the first IP address. It may be understood that the IP address included in the ECS option may represent location information of the application platform. In this case, the DNS server determines, based on the IP address included in each ECS option in the ECS option list, location information of an application platform represented by the IP address, and further determines an IP address of a server that is of the first application and that is deployed on the application platform as the first IP address.

When the ECS option list includes a plurality of IP addresses, the centralized DNS server may determine the target ECS option in the ECS option list according to a local policy. In an implementation, when the DNS server determines a plurality of MEC platforms based on the plurality of IP addresses included in the ECS option list, the DNS server uses an MEC platform with lower load as a target MEC platform based on load statuses of the plurality of MEC platforms, and uses, as the target ECS option, an ECS option including an IP address corresponding to the MEC platform.

It should be noted that the DNS proxy in the example 1 may be replaced with the ARF.

Example 2: The second information includes the IP address corresponding to the first application platform, and the first network element is the DNS proxy. Specifically, in the following, an ECS option list may represent the second information, and the ECS option list includes the IP address corresponding to the first application platform. The ECS option list includes one or more ECS options, and each ECS option includes the IP address corresponding to the first application platform. If there are a plurality of first application platforms, there are also a plurality of IP addresses corresponding to the plurality of first application platforms. The DNS proxy adds, as the ECS option list, the IP addresses respectively corresponding to the plurality of application platforms to a DNS request message. If a destination address in the DNS query request is an address of the DNS proxy, the DNS proxy sends the DNS request message including the ECS option list to the centralized DNS server based on a configured address of the centralized DNS server. If a destination address in the DNS query request is an address of the centralized DNS server, the DNS proxy sends the DNS request message including the ECS option list to the centralized DNS server. The centralized DNS server determines, based on the first domain name and the ECS option list that are included in the DNS query request, an application platform to which the IP address in the ECS option list points, and further determines an IP address of a server that is of the first application and that is deployed on the application platform, namely, the first IP address. The centralized DNS server supports the first domain name. The centralized DNS server sends a DNS response message to the DNS proxy, where the DNS response message includes the first IP address. The DNS proxy sends a DNS response message to the terminal device, where the DNS response message includes the first IP address.

In addition, when there are a plurality of first application platforms, the ECS option list includes a plurality of IP addresses. The centralized DNS server determines a target ECS option based on the first domain name and the ECS option list, determines an application platform to which an IP address corresponding to the target ECS option points, and further determines an IP address of a server that is of the first application and that is deployed on the application platform as the first IP address. It may be understood that the IP address included in the ECS option may represent location information of the application platform. In this case, the DNS server determines, based on the IP address included in each ECS option in the ECS option list, location information of an application platform represented by the IP address, and further determines an IP address of a server that is of the first application and that is deployed on the application platform as the first IP address.

Similarly, when the ECS option list includes a plurality of IP addresses, the centralized DNS server may determine the target ECS option in the ECS option list according to a local policy. Repeated content is not described again.

It should be noted that the DNS proxy in the example 2 may be replaced with the ARF.

Example 3: The second information includes the DNAI corresponding to the first application platform, and the first network element is the centralized DNS server. Specifically, in the following, a DNAI list may represent the second information, and the DNAI list includes the DNAI corresponding to the first application platform. An ECS option list includes one or more ECS options, and each ECS option includes the IP address corresponding to the first application platform. If there are a plurality of first application platforms, there are also a plurality of IP addresses corresponding to the plurality of first application platforms. The centralized DNS server determines, based on the correspondence between the at least one DNAI respectively corresponding to the at least one application platform on which the first application is deployed and the at least one IP address respectively corresponding to the at least one application platform on which the first application is deployed, the IP address corresponding to the first application platform, and uses the 1P address corresponding to the first application platform as the ECS option list. The centralized DNS server determines, based on the first domain name and the ECS option list, an application platform to which the IP address in the ECS option list points, and further determines an IP address of a server that is of the first application and that is deployed on the application platform, namely, the first IP address. The centralized DNS server supports the first domain name. The centralized DNS server sends a DNS response message to the terminal device, where the DNS response message includes the first IP address.

In addition, when there are a plurality of first application platforms, the DNAI list includes a plurality of DNAIs, and the DNS proxy determines the ECS option list based on the correspondence between the at least one DNAI respectively corresponding to the at least one application platform on which the first application is deployed and the at least one IP address respectively corresponding to the at least one application platform on which the first application is deployed, where the ECS option list includes IP addresses respectively corresponding to the plurality of DNAIs. The centralized DNS server determines a target ECS option based on the first domain name and the ECS option list, determines an application platform to which an IP address corresponding to the target ECS option points, and further determines an IP address of a server that is of the first application and that is deployed on the application platform as the first IP address. It may be understood that the IP address included in the ECS option may represent location information of the application platform. In this case, the DNS server determines, based on the IP address included in each ECS option in the ECS option list, location information of an application platform represented by the IP address, and further determines an IP address of a server that is of the first application and that is deployed on the application platform as the first IP address.

When the ECS option list includes a plurality of IP addresses, the centralized DNS server may determine the target ECS option in the ECS option list according to a local policy. The centralized DNS server sends a DNS response message to the terminal device, where the DNS response message includes the first IP address. Repeated content is not described again.

It should be noted that the centralized DNS server in the example 3 may be replaced with the ARF.

Example 4: The second information includes the IP address corresponding to the first application platform, and the first network element is the centralized DNS server. Specifically, in the following, an ECS option list may represent the second information, and the ECS option list includes the IP address corresponding to the first application platform. The ECS option list includes one or more ECS options, and each ECS option includes the IP address corresponding to the first application platform. If there are a plurality of first application platforms, there are also a plurality of IP addresses corresponding to the plurality of first application platforms. The centralized DNS server determines, based on the first domain name and the ECS option list, an application platform to which the IP address in the ECS option list points, and further determines an IP address of a server that is of the first application and that is deployed on the application platform, namely, the first IP address. The centralized DNS server supports the first domain name. The centralized DNS server sends a DNS response message to the terminal device, where the DNS response message includes the first IP address.

In addition, when there are a plurality of first application platforms, the ECS option list includes a plurality of IP addresses. The centralized DNS server determines a target ECS option based on the first domain name and the ECS option list, determines an application platform to which an IP address corresponding to the target ECS option points, and further determines an IP address of a server that is of the first application and that is deployed on the application platform as the first IP address. It may be understood that the IP address included in the ECS option may represent location information of the application platform. In this case, the DNS server determines, based on the IP address included in each ECS option in the ECS option list, location information of an application platform represented by the IP address, and further determines an IP address of a server that is of the first application and that is deployed on the application platform as the first IP address.

Similarly, when the ECS option list includes a plurality of IP addresses, the centralized DNS server may determine the target ECS option in the ECS option list according to a local policy. Repeated content is not described again.

It should be noted that the centralized DNS server in the example 4 may be replaced with the ARF.

In addition, in a possible design, the first network element sends third information to the SMF network element, where the third information includes at least one of a DNAI corresponding to a second application platform on which the first application is deployed, an IP address corresponding to the second application platform on which the first application is deployed, or the first IP address. The first IP address is an IP address of a server that is of the first application and that is deployed on the second application platform. The SMF network element selects a UL CL or a BP and a local PDU session anchor for a PDU session of the terminal device based on the third information, so that after the DNS server returns an IP address of an application server closer to the terminal device to the terminal device, service traffic is selectively routed to an application platform on which the application server is deployed. It should be understood that the second application platform is an application platform in the at least one first application platform.

In conclusion, the first network element sends the first information to the SMF network element. The SMF network element determines the second information based on the location information of the UE and the first information, and sends the second information to the first network element, where the second information is for obtaining the first IP address corresponding to the first domain name sent by the terminal device. After obtaining the first IP address, the first network element sends the first IP address to the terminal device. Therefore, when the terminal device accesses the first domain name by using the first IP address at the location indicated by the location information of the terminal device, the terminal device can access a local service nearby, so that a service access latency can be reduced, to improve communication efficiency.

The following describes the embodiment shown in FIG. 6 in detail with reference to specific embodiments.

Figure 7A:
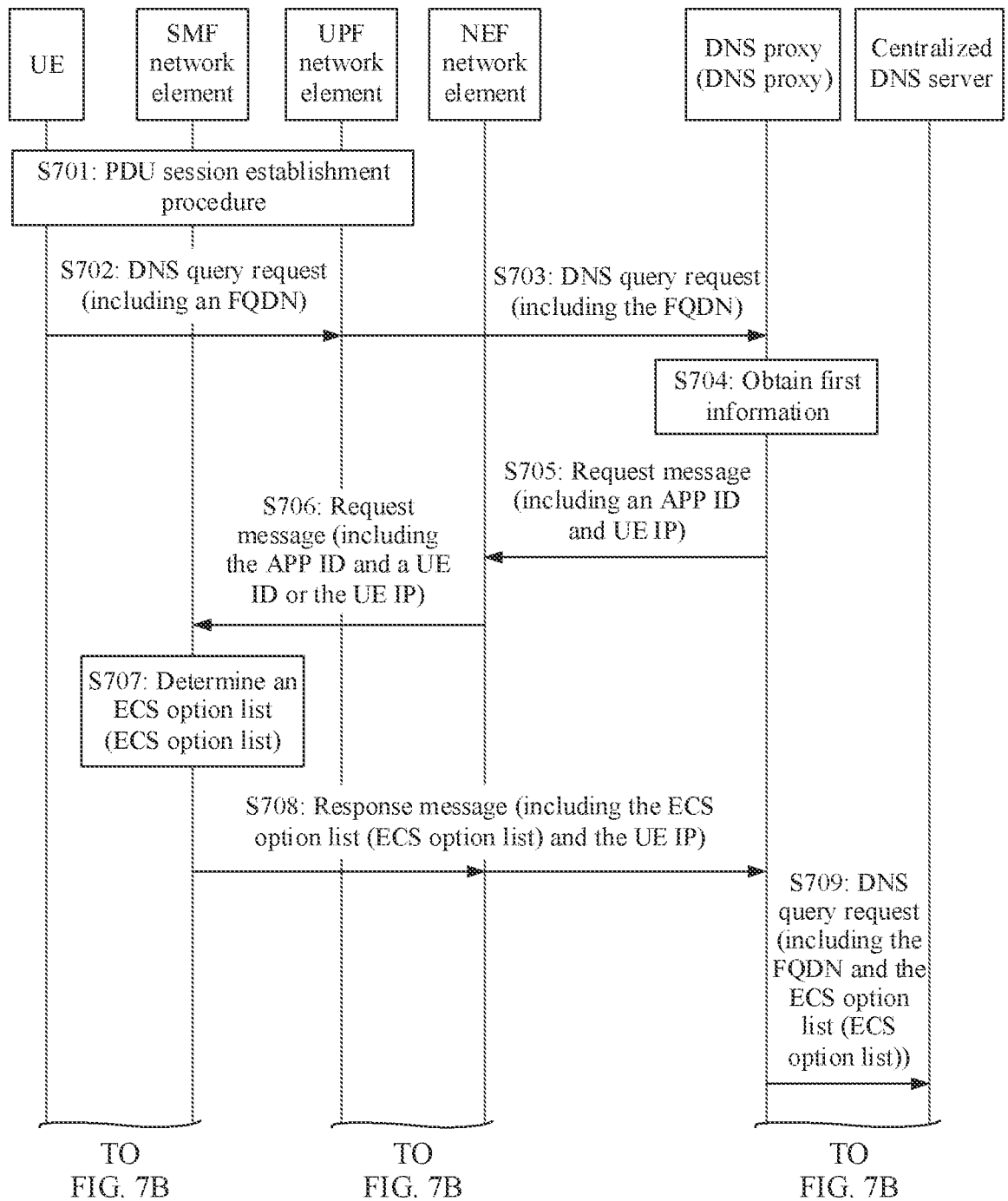
FIG. 7A and FIG. 7B are a first specific flowchart of requesting an IP address corresponding to a domain name by UE according to this application.
Figure 7B:
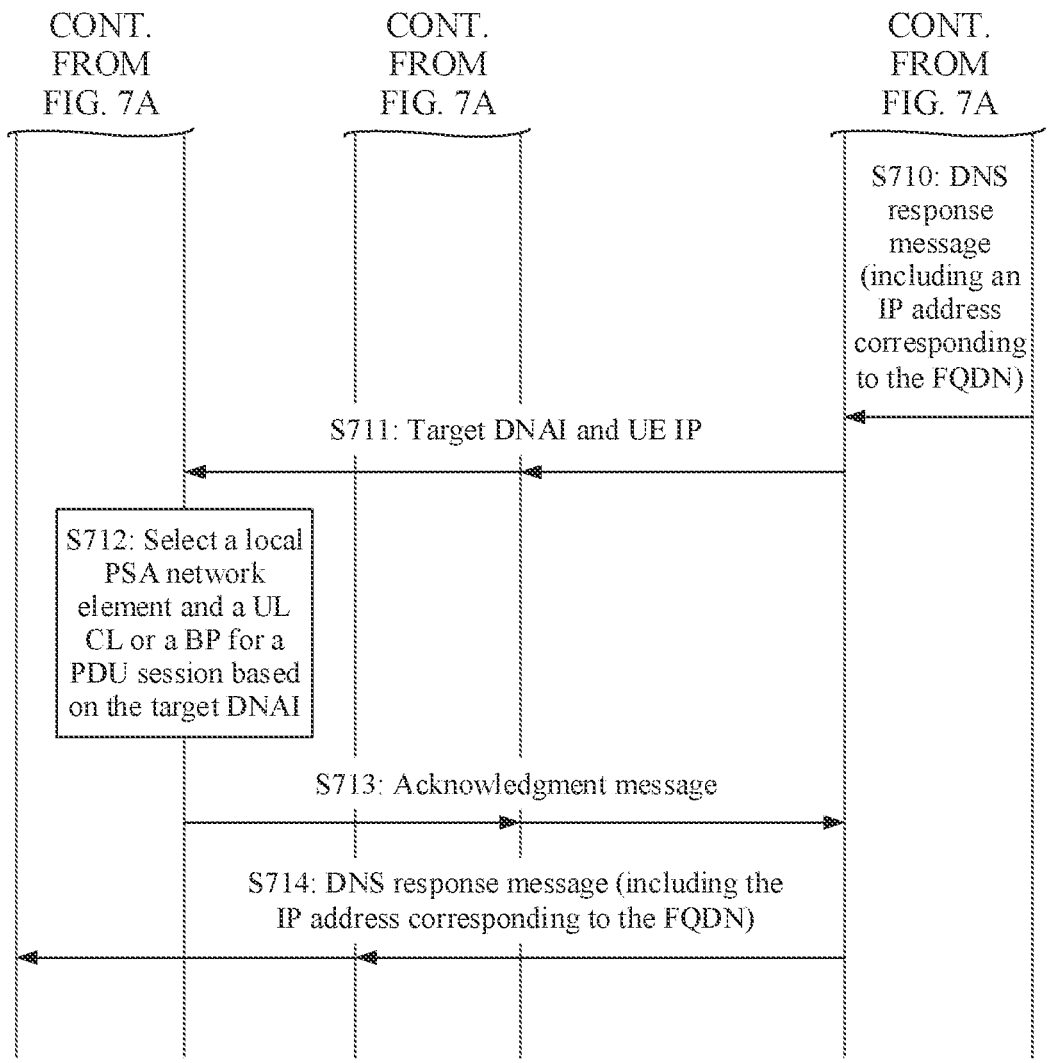
Figure 13:
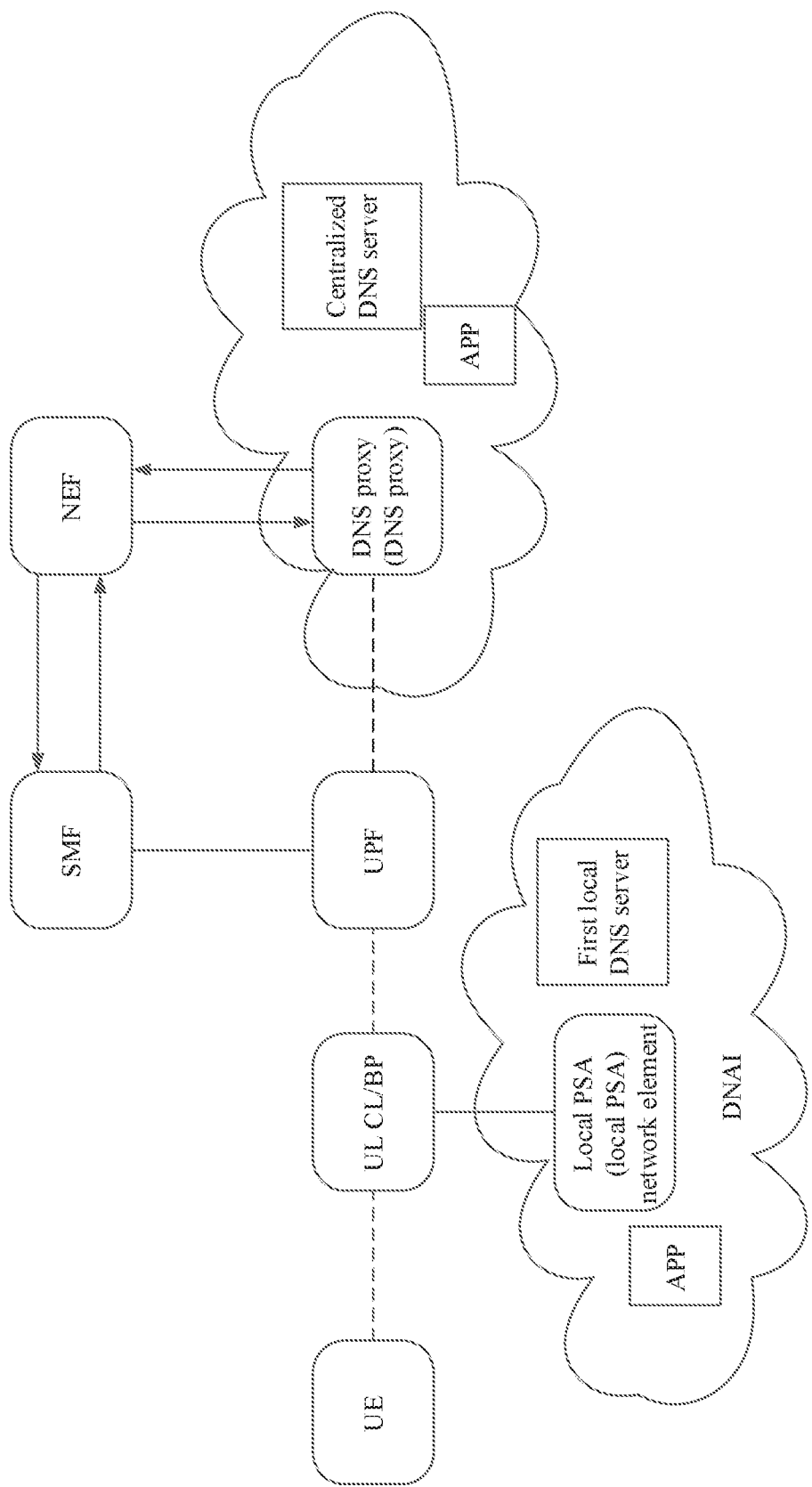
FIG. 13 is a schematic diagram of a network architecture including network elements that may be involved in requesting an IP address corresponding to a domain name by UE according to this application.

Embodiment 1: FIG. 7A and FIG. 7B are a first specific flowchart of requesting an IP address corresponding to a domain name by UE when a first network element is a DNS proxy. FIG. 13 is a schematic diagram of a network architecture including network elements that may be involved in the embodiment shown in FIG. 7A and FIG. 7B. A correspondence among a domain name, an identifier of an application, and at least one DNAI respectively corresponding to at least one application platform on which each application is deployed is configured on the DNS proxy. The DNS proxy may obtain the configured content through an AF. In addition, an IP address corresponding to each application platform is configured on an SMF network element. Each application platform is represented by a DNAI corresponding to the application platform.

S701: The UE initiates a PDU session establishment procedure.

Specifically, the UE sends parameters such as a PDU session identifier, S-NSSAI, and a DNN to an AMF network element. The AMF network element selects the SMF network element based on the S-NSSAI and the DNN, and sends parameters such as an identifier of the AMF network element, a permanent identifier of the UE, location information of the UE, the PDU session identifier, the S-NSSAI, and the DNN to the SMF network element. The location information of the UE includes a TAI of the UE. The SMF selects an anchor UPF network element for a PDU session.

S702: The UE sends a DNS query request to the anchor UPF network element through an access network device.

The DNS query request carries a domain name, and further includes a destination address, where the destination address is an address of the DNS proxy or an address of a centralized DNS server. The centralized DNS server may be a centralized DNS server deployed by a carrier. The domain name carried in the DNS query request may be an FQDN or a domain name in another form. This is not limited in this application. The following only uses the FQDN as an example for description.

S703: The UPF network element sends the DNS query request to the DNS proxy.

Specifically, after the UPF network element receives the DNS query request, if the destination address in the DNS query request is the address of the DNS proxy, the UPF sends the DNS query request to the DNS proxy; or if the destination address in the DNS query request is the address of the centralized DNS server, in a routing process in which the UPF sends the DNS query request to the centralized DNS server, the DNS query request first passes through the DNS proxy before reaching the centralized DNS server.

S704: The DNS proxy obtains first information.

Specifically, the DNS proxy determines, based on the FQDN in the DNS query request and the correspondence between a domain name and an identifier of an application, an APP ID corresponding to the FQDN in the DNS query request. The first information includes the APP ID.

S705: The DNS proxy sends a request message to a NEF network element, where the request message carries the APP ID and UE IP.

S706: The NEF network element sends a request message to the SMF network element, where the request message carries the APP ID and a UE ID or the UE IP.

Specifically, the NEF network element determines the UE ID based on the UE IP, and determines, based on the UE ID, the SMF network element that serves the UE, where the UE ID may be the permanent identifier SUPI of the UE.

S707: The SMF network element determines an ECS option list.

Specifically, the SMF network element determines a DNAI list based on the APP ID, a current TAI of the UE, and at least one DNAI respectively corresponding to at least one application platform on which an application identified by the APP ID is deployed, and determines, based on the DNAI list and an IP address corresponding to each application platform, an IP address corresponding to each DNAI in the DNAI list, to obtain the ECS option list.

The DNAI list includes at least one DNAI, and the ECS option list includes at least one ECS option respectively corresponding to the at least one DNAI. Each ECS option includes one IP address.

S708: The SMF sends a response message to the DNS proxy through the NEF network element, where the response message carries the ECS option list and the UE IP.

S709: The DNS proxy adds the ECS option list to the DNS query request, and sends the DNS query request including the ECS option list to the centralized DNS server.

If the destination address in the DNS query request sent by the UE is the IP address of the DNS proxy, the DNS proxy adds the ECS option list to the DNS query request, and sends the DNS query request including the ECS option list to the centralized DNS server based on the IP address of the centralized DNS server configured on the DNS proxy.

If the destination address in the DNS query request sent by the UE is the IP address of the centralized DNS server, the DNS proxy adds the ECS option list to the DNS query request, and sends the DNS query request including the ECS option list to the centralized DNS server based on the destination address.

S710: The centralized DNS server sends a DNS response message to the DNS proxy, where the DNS response message carries an IP address corresponding to the FQDN.

Specifically, the centralized DNS server determines, based on the FQDN and the ECS option list that are in the DNS query request, an application platform to which the IP address in the ECS option points, and further determines an IP address of a server deployed on the application platform as the IP address corresponding to the FQDN. The server supports the FQDN in the DNS query request.

If the ECS option list includes a plurality of ECS options, the centralized DNS server may select a target ECS option from the plurality of ECS options, and further determine, as the IP address corresponding to the FQDN, an IP address of a server deployed on an application platform corresponding to the target ECS option. The server supports the FQDN in the DNS query request.

S711: The DNS proxy sends a target DNAI and the UE IP to the SMF network element through the NEF.

Specifically, the DNS proxy determines, based on the IP address that corresponds to the FQDN and that is carried in the DNS response message, a DNAI (referred to as the target DNAI) of the application platform on which the server to which the IP address points is deployed.

For example, a correspondence between an IP address space (or an IP address segment) and a DNAI of an application platform corresponding to the IP address space is configured on the DNS proxy. For example, the DNS proxy may obtain the configured content through the AF. When obtaining the IP address corresponding to the FQDN, the DNS proxy may determine an address space (or an IP address segment) to which the IP address belongs, and further determine a DNAI of an application platform corresponding to the address space (or the IP address segment).

The UE IP may be used to identify the UE.

S712: The SMF network element selects a local PSA network element and a UL CL or a BP for the PDU session based on the target DNAI.

Specifically, the SMF network element determines the PDU session of the UE based on the UE IP, and selects the local PSA network element for the PDU session based on the target DNAI. Further, the SMF selects the UL CL or the BP for the PDU session based on the target DNAI, to implement local steering, optimize a service access path, and improve communication efficiency.

S713: After performing S711, the SMF network element sends an acknowledgment message to the DNS proxy.

The acknowledgment message carries the UE IP.

S714: The DNS proxy sends a DNS response message to the UE through the anchor UPF, where the DNS response message carries the IP address corresponding to the FQDN.

It should be noted that, the DNS proxy in Embodiment 1 may be replaced with an ARF.

In Embodiment 1, in a scenario in which the first network element is the DNS proxy, and second information includes the ECS option list, when the UE accesses, by using the IP address returned by the first network element, the FQDN at a location indicated by the location information of the UE, the UE can access a local service nearby, and a service access latency can be reduced, to improve the communication efficiency.

Figure 8A:
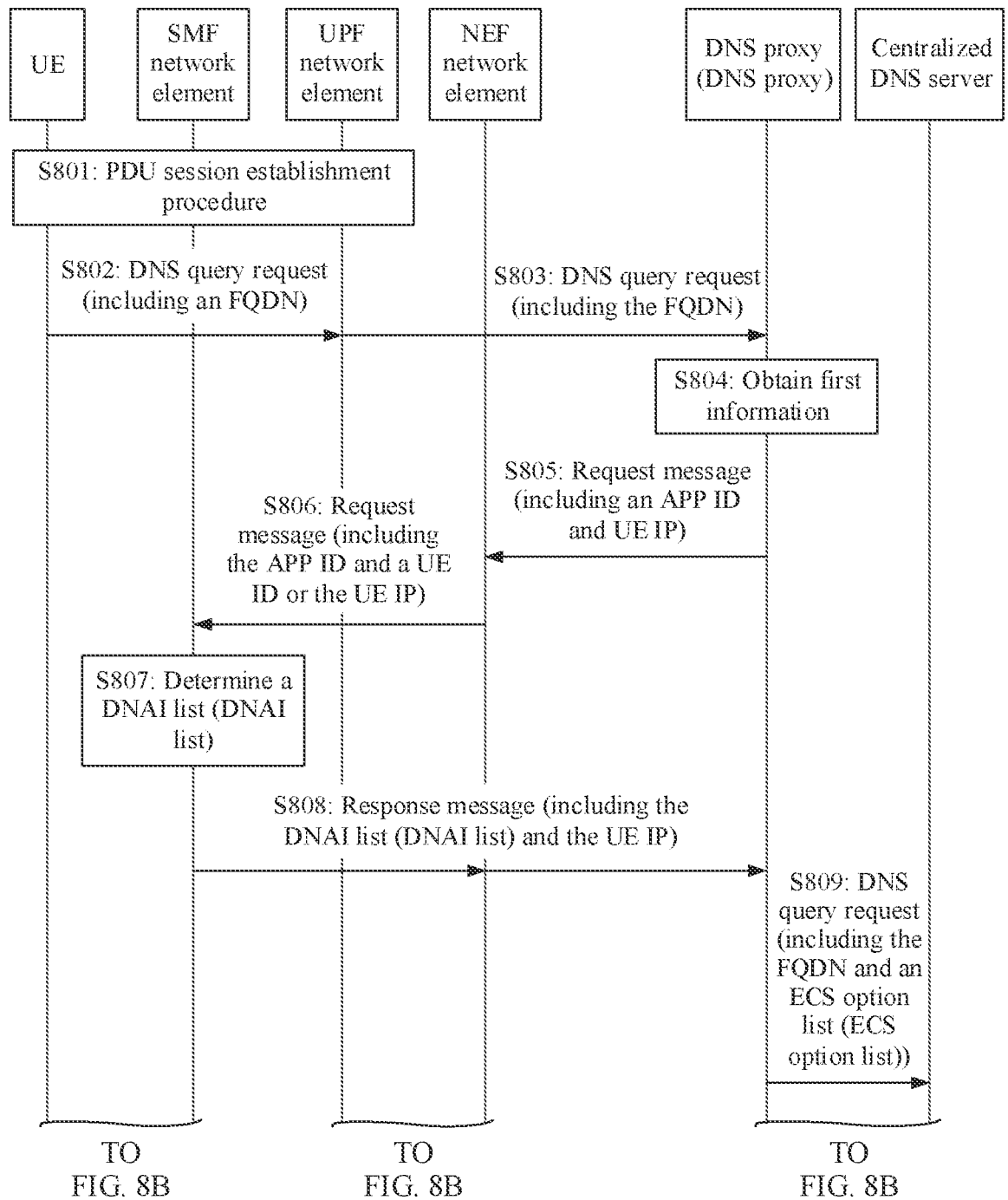
FIG. 8A and FIG. 8B are a second specific flowchart of requesting an IP address corresponding to a domain name by UE according to this application.
Figure 8B:
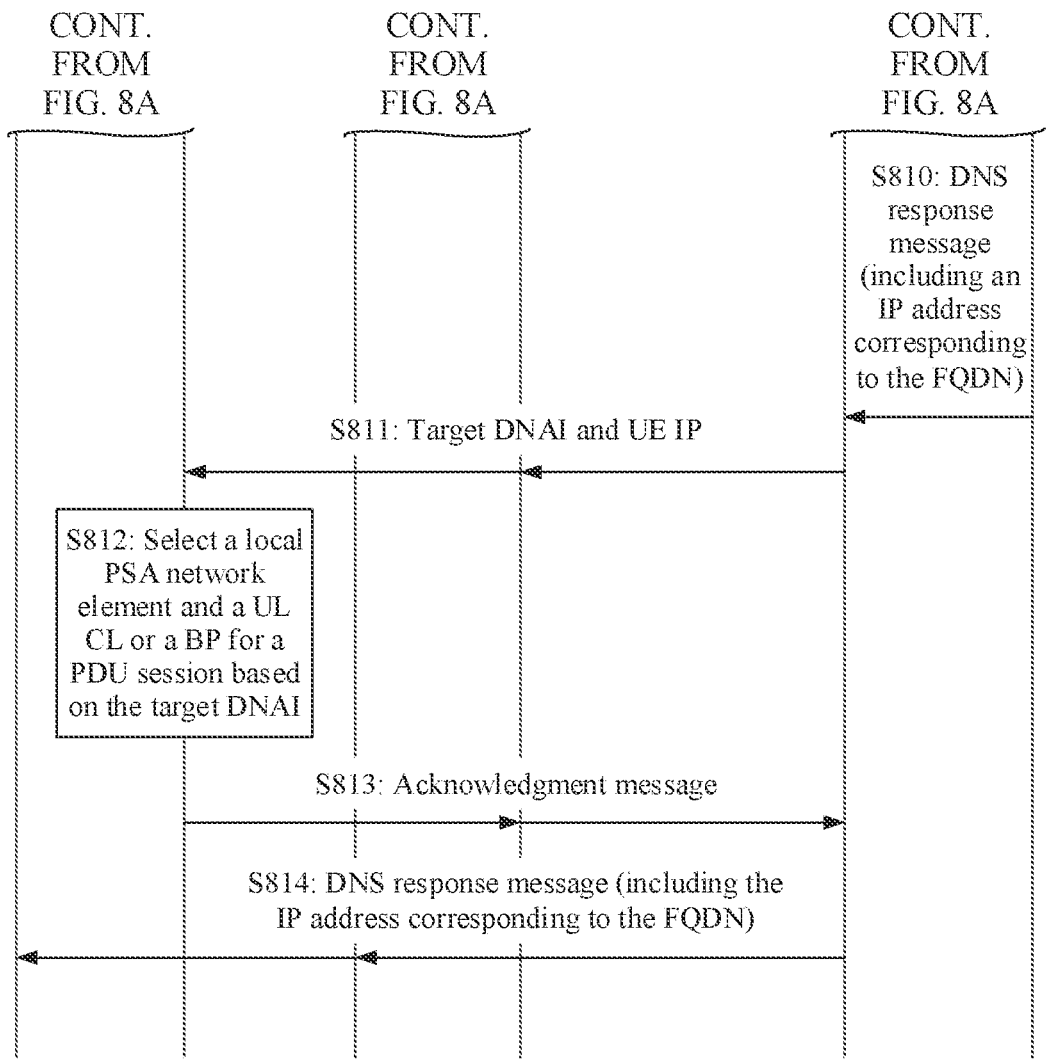

Embodiment 2: FIG. 8A and FIG. 8B are a second specific flowchart of requesting an IP address corresponding to a domain name by UE when a first network element is a DNS proxy. FIG. 13 is a schematic diagram of a network architecture including network elements that may be involved in the embodiment shown in FIG. 8A and FIG. 8B. A correspondence among a domain name, an identifier of an application, and at least one DNAI respectively corresponding to at least one application platform on which each application is deployed and an IP address corresponding to each application platform are configured on the DNS proxy. Each application platform is represented by a DNAI corresponding to the application platform. The DNS proxy may obtain the configured content through an AF.

For details of S801 to S806, refer to S701 to S706, and repeated content is not described again.

S807: The SMF network element determines a DNAI list.

Specifically, the SMF network element determines the DNAI list based on the APP ID, a current TAI of the UE, and at least one DNAI respectively corresponding to at least one application platform on which an application identified by the APP ID is deployed, where the DNAI list includes at least one DNAI.

S808: The SMF sends a response message to the DNS proxy through the NEF network element, where the response message carries the DNAI list and the UE IP.

S809: The DNS proxy determines an ECS option list based on the DNAI list, adds the ECS option list to the DNS query request, and sends the DNS query request including the ECS option list to the centralized DNS server.

Specifically, the DNS proxy determines, based on the DNAI list and the IP address corresponding to each application platform, an IP address corresponding to each DNAI in the DNAI list, to obtain the ECS option list. The ECS option list includes at least one ECS option respectively corresponding to the at least one DNAI, and each ECS option includes one IP address.

If the destination address in the DNS query request sent by the UE is the address of the DNS proxy, the DNS proxy adds the ECS option list to the DNS query request, and sends the DNS query request including the ECS option list to the centralized DNS server based on the address of the centralized DNS server configured on the DNS proxy.

If the destination address in the DNS query request sent by the UE is the address of the centralized DNS server, the DNS proxy adds the ECS option list to the DNS query request, and sends the DNS query request including the ECS option list to the centralized DNS server based on the destination address.

For details of S810 to S814, refer to S710 to S714, and repeated content is not described again.

It should be noted that, the DNS proxy in Embodiment 2 may be replaced with an ARF.

In Embodiment 2, in a scenario in which the first network element is the DNS proxy, and second information includes the DNAI list, when the UE accesses, by using the IP address returned by the first network element, the FQDN at a location indicated by the location information of the UE, the UE can access a local service nearby, and a service access latency can be reduced, to improve communication efficiency.

Figure 9A:
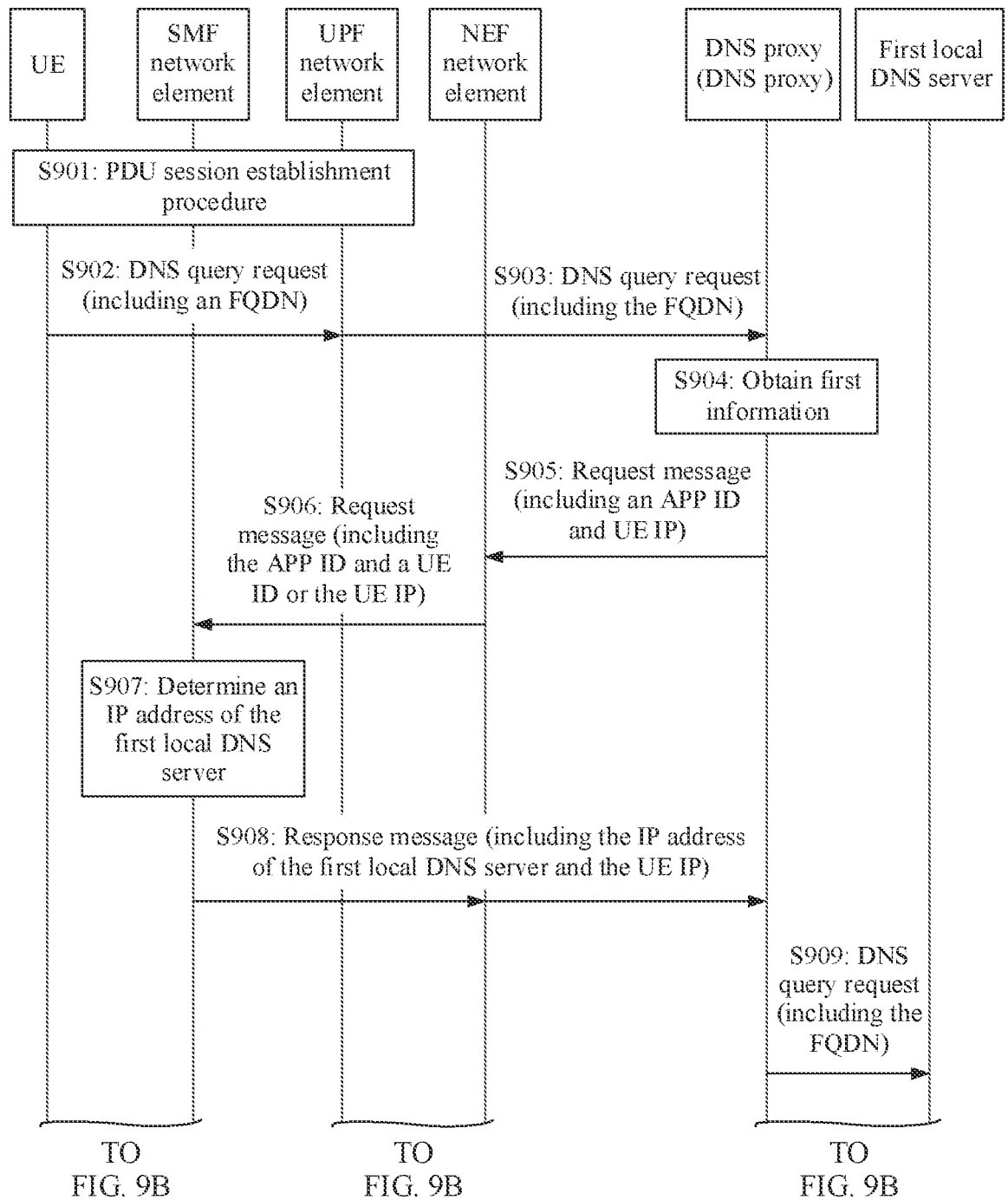
FIG. 9A and FIG. 9B are a third specific flowchart of requesting an IP address corresponding to a domain name by UE according to this application.
Figure 9B:
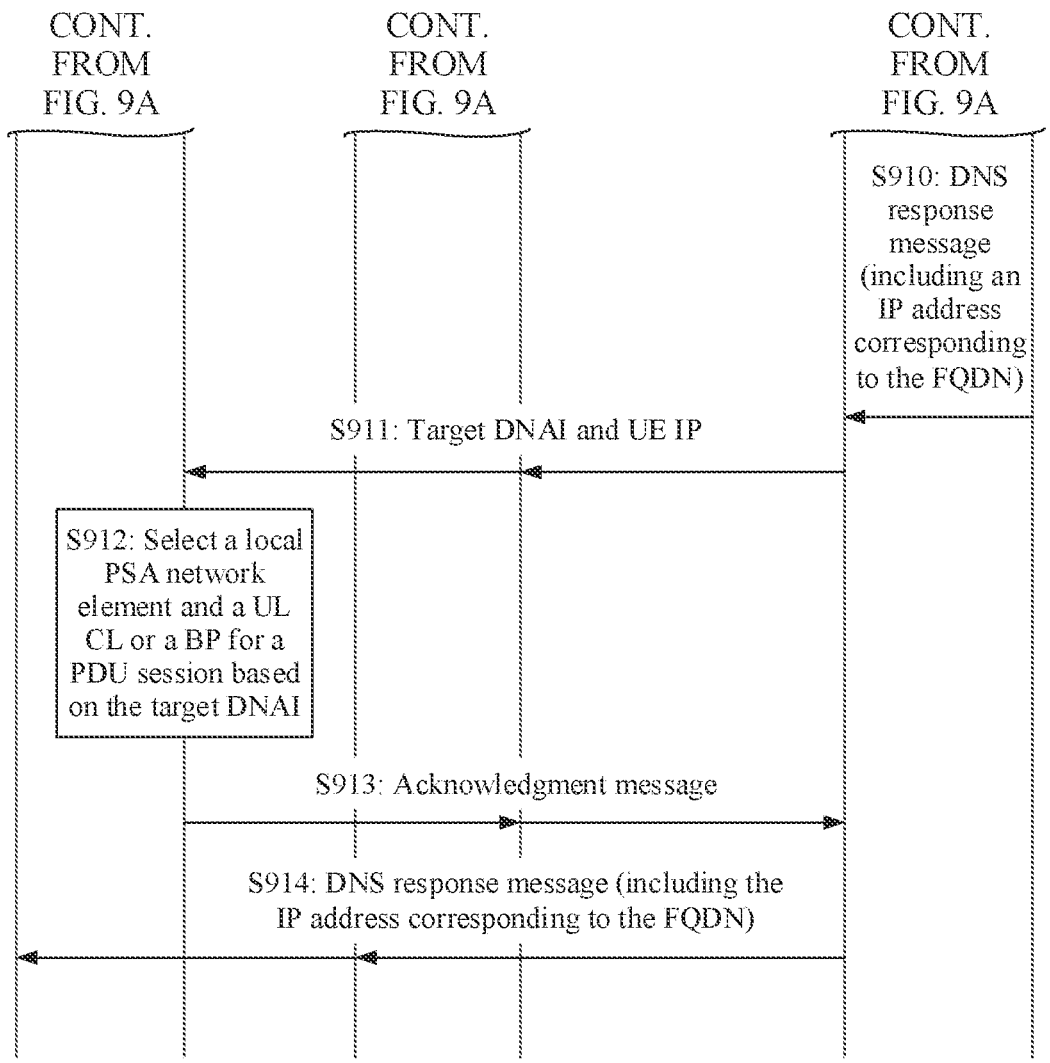

Embodiment 3: FIG. 9A and FIG. 9B are a third specific flowchart of requesting an IP address corresponding to a domain name by UE when a first network element is a DNS proxy. FIG. 13 is a schematic diagram of a network architecture including network elements that may be involved in the embodiment shown in FIG. 9A and FIG. 9B. A correspondence among a domain name, an identifier of an application, and at least one DNAI respectively corresponding to at least one application platform on which each application is deployed is configured on the DNS proxy. The DNS proxy may obtain the configured content through an AF. In addition, an IP address that is of a local DNS server and that corresponds to each application platform is configured on an SMF network element. Each application platform is represented by a DNAI corresponding to the application platform.

For details of S901 to S906, refer to S701 to S706, and repeated content is not described again.

S907: The SMF network element determines an IP address of a first local DNS server.

Specifically, the SMF network element determines a DNAI list based on the APP ID, a current TAI of the UE, and at least one DNAI respectively corresponding to at least one application platform on which an application identified by the APP ID is deployed, where the DNAI list includes at least one DNAI.

The SMF network element further determines, based on the DNAI list and the IP address that is of the local DNS server and that corresponds to each application platform, an IP address that is of a local DNS server and that corresponds to each DNAI in the DNAI list. If the DNAI list includes one DNAI, an IP address that is of a local DNS server and that corresponds to the DNAI is used as the IP address of the first local DNS server. If the DNAI list includes a plurality of DNAIs, IP addresses of a plurality of local DNS servers are determined, and an IP address of a local DNS server is determined, as the IP address of the first local DNS server, in the IP addresses of the plurality of local DNS servers according to a local policy.

S908: The SMF sends a response message to the DNS proxy through the NEF network element, where the response message carries the IP address of the first local DNS server and the UE IP.

S909: The DNS proxy sends the DNS query request to the first local DNS server.

Specifically, because the destination address in the DNS query request is the address of the DNS proxy or the address of the centralized DNS server, the DNS proxy may replace the destination address in the DNS query request with the IP address of the first local DNS server, and send the DNS query request to the first local DNS server.

S910: The first local DNS server sends a DNS response message to the DNS proxy, where the DNS response message carries an IP address corresponding to the FQDN.

Specifically, the first local DNS server determines, based on the FQDN in the DNS query request, an IP address of a server deployed on an application platform as the IP address corresponding to the FQDN. The server supports the FQDN in the DNS query request.

For details of S911 to S914, refer to S711 to S714, and repeated content is not described again.

It should be noted that, the DNS proxy in Embodiment 3 may be replaced with an ARF.

In Embodiment 3, in a scenario in which the first network element is the DNS proxy, and second information includes the IP address of the first local DNS server, when the UE accesses, by using the IP address returned by the first network element, the FQDN at a location indicated by the location information of the UE, the UE can access a local service nearby, and a service access latency can be reduced, to improve communication efficiency.

Figure 10A:
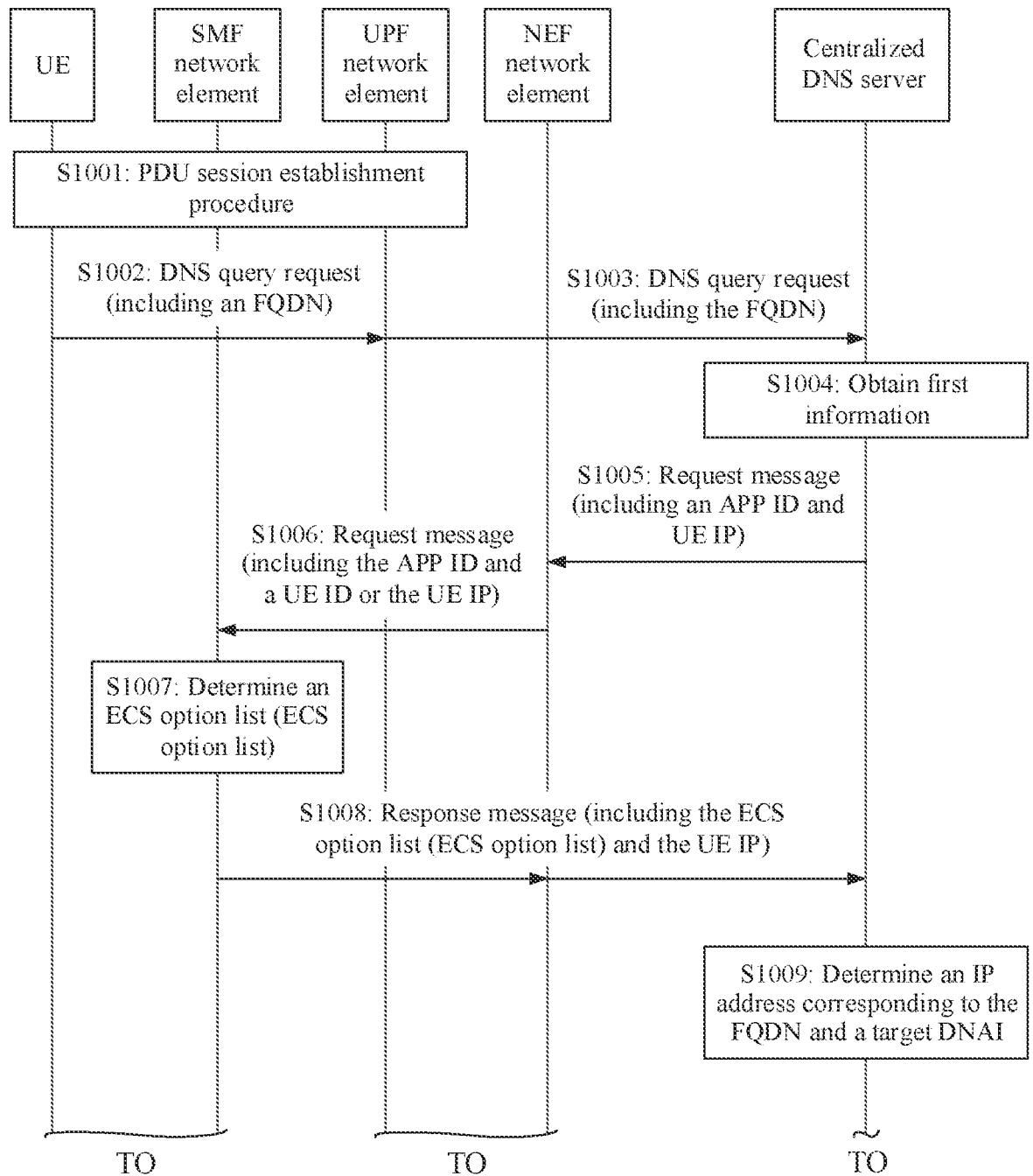
FIG. 10A and FIG. 10B are a fourth specific flowchart of requesting an IP address corresponding to a domain name by UE according to this application.
Figure 10B:
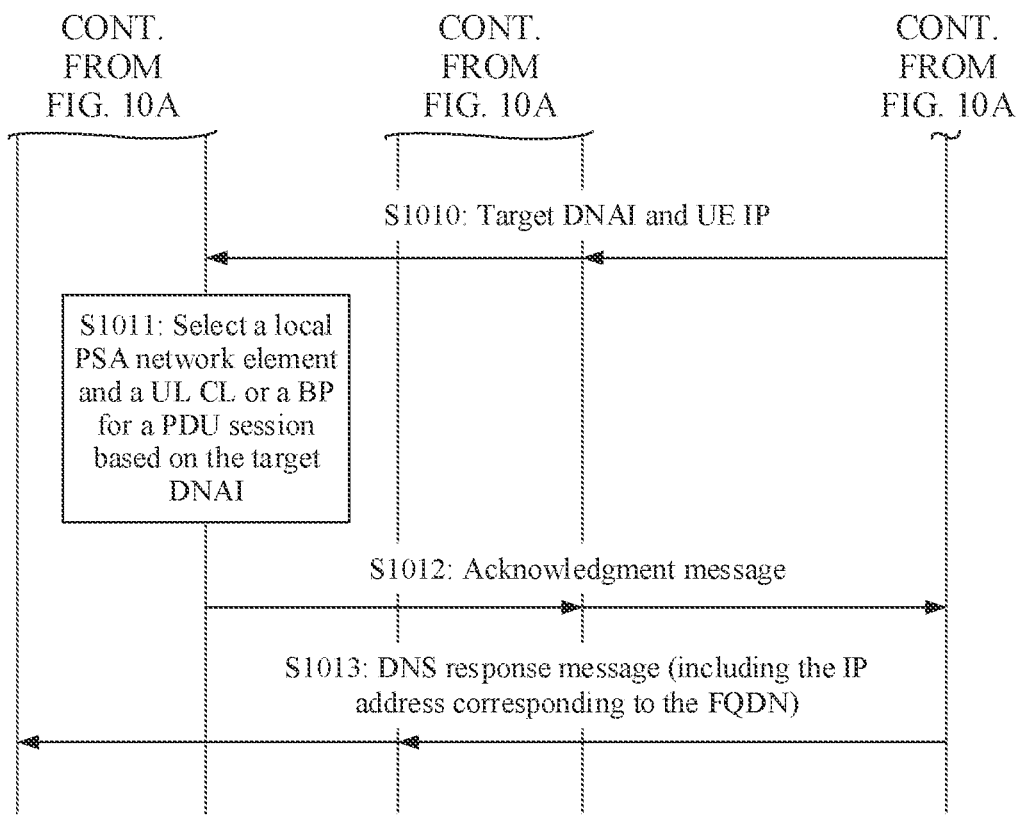

Embodiment 4: As shown in FIG. 10A and FIG. 10B, a first network element is a centralized DNS server. A correspondence among a domain name, an identifier of an application, and at least one DNAI respectively corresponding to at least one application platform on which each application is deployed is configured on the centralized DNS server. The centralized DNS server may obtain the configured content through an AF. In addition, an IP address corresponding to each application platform is configured on an SMF network element. Each application platform is represented by a DNAI corresponding to the application platform.

S1001: UE initiates a PDU session establishment procedure.

Specifically, the UE sends parameters such as a PDU session identifier, S-NSSAI, and a DNN to an AMF network element. The AMF network element selects the SMF network element based on the S-NSSAI and the DNN, and sends parameters such as an identifier of the AMF network element, a permanent identifier of the UE, location information of the UE, the PDU session identifier, the S-NSSAI, and the DNN to the SMF network element. The location information of the UE includes a TAI of the UE. The SMF selects an anchor UPF network element for a PDU session.

S1002: The UE sends a DNS query request to the anchor UPF network element through an access network device.

The DNS query request carries a domain name, and further includes a destination address, where the destination address is an IP address of the centralized DNS server. The centralized DNS server may be a centralized DNS server deployed by a carrier. The domain name carried in the DNS query request may be an FQDN or a domain name in another form. This is not limited in this application. The following only uses the FQDN as an example for description.

S1003: The UPF network element sends the DNS query request to the centralized DNS server.

S1004: The centralized DNS server obtains first information.

Specifically, the centralized DNS server determines, based on the FQDN in the DNS query request and the correspondence between a domain name and an identifier of an application, an APP ID corresponding to the FQDN in the DNS query request. The first information includes the APP ID.

S1005: The centralized DNS server sends a request message to a NEF network element, where the request message carries the APP ID and UE IP.

S1006: The NEF network element sends a request message to the SMF network element, where the request message carries the APP ID and a UE ID or the UE IP.

Specifically, the NEF network element determines the UE ID based on the UE IP, and determines, based on the UE ID, the SMF network element that serves the UE, where the UE ID may be the permanent identifier SUPI of the UE.

S1007: The SMF network element determines an ECS option list.

Specifically, the SMF network element determines a DNAI list based on the APP ID, a current TAI of the UE, and at least one DNAI respectively corresponding to at least one application platform on which an application identified by the APP ID is deployed, and determines, based on the DNAI list and the IP address corresponding to each application platform, an IP address corresponding to each DNAI in the DNAI list, to obtain the ECS option list.

The DNAI list includes at least one DNAI, and the ECS option list includes at least one ECS option respectively corresponding to the at least one DNAI. Each ECS option includes one IP address.

S1008: The SMF sends a response message to the centralized DNS server through the NEF network element, where the response message carries the ECS option list and the UE IP.

S1009: The centralized DNS server determines an IP address corresponding to the FQDN and a target DNAI.

Specifically, the centralized DNS server determines, based on the FQDN in the DNS query request and the ECS option list, an application platform to which the IP address in the ECS option points, and further determines an IP address of a server deployed on the application platform as the IP address corresponding to the FQDN. The server supports the FQDN in the DNS query request. After determining the application platform to which the IP address in the ECS option points, the centralized DNS server uses a DNAI of the application platform as the target DNAI.

If the ECS option list includes a plurality of ECS options, the centralized DNS server may select a target ECS option from the plurality of ECS options, and further determine, as the IP address corresponding to the FQDN, an IP address of a server deployed on an application platform corresponding to the target ECS option. The server supports the FQDN in the DNS query request. The centralized DNS server determines that a DNAI of the application platform to which the target ECS option points is referred to as the target DNAI.

For example, a correspondence between an IP address space (or an IP address segment) and a DNAI of an application platform corresponding to the IP address space is configured on the centralized DNS server. For example, the centralized DNS server may obtain the configured content through the AF. When obtaining the IP address corresponding to the FQDN, the centralized DNS server may determine an address space (or an IP address segment) to which the IP address belongs, and further determine a DNAI of an application platform corresponding to the address space (or the IP address segment).

S1010: The centralized DNS server sends the target DNAI and the UE IP to the SMF network element through the NEF.

The UE IP may be used to identify the UE.

S1011: The SMF network element selects a local PSA network element and a UL CL or a BP for the PDU session based on the target DNAI.

Specifically, the SMF network element determines the PDU session of the UE based on the UE IP, and selects the local PSA network element for the PDU session based on the target DNAI. Further, the SMF network element selects the UL CL or the BP for the PDU session based on the target DNAI, to implement local steering, optimize a service access path, and improve communication efficiency.

S1012: After performing S1011, the SMF network element sends an acknowledgment message to the centralized DNS server.

The acknowledgment message carries the UE IP.

S1013: The centralized DNS server sends a DNS response message to the UE through the anchor UPF, where the DNS response message carries the IP address corresponding to the FQDN.

It should be noted that the centralized DNS server in Embodiment 4 may be replaced with an ARF.

In Embodiment 4, in a scenario in which the first network element is the centralized DNS server, and second information includes the ECS option list, when the UE accesses, by using the IP address returned by the first network element, the FQDN at a location indicated by the location information of the UE, the UE can access a local service nearby, and a service access latency can be reduced, to improve the communication efficiency.

Figure 11A:
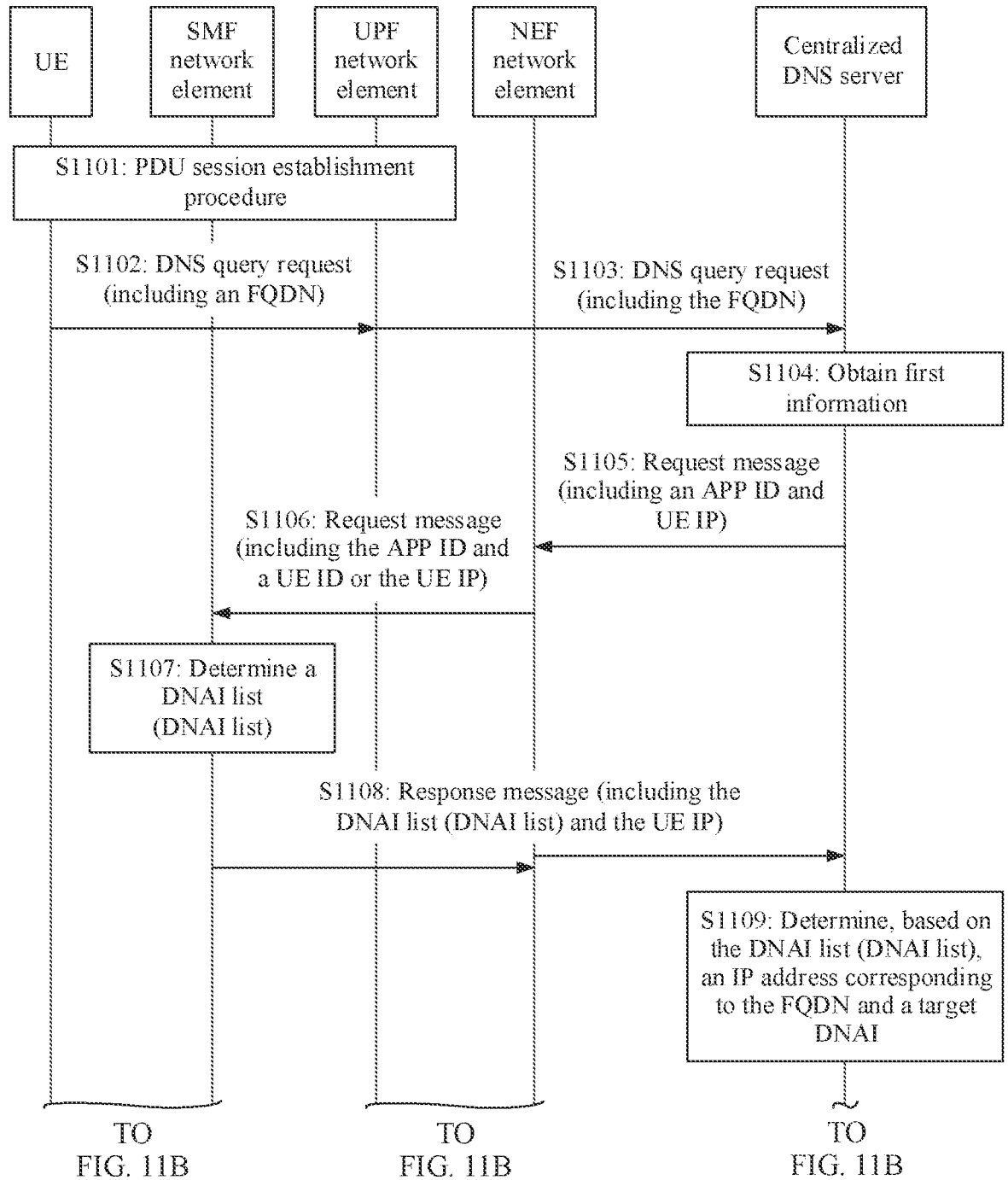
FIG. 11A and FIG. 11B are a fifth specific flowchart of requesting an IP address corresponding to a domain name by UE according to this application.
Figure 11B:
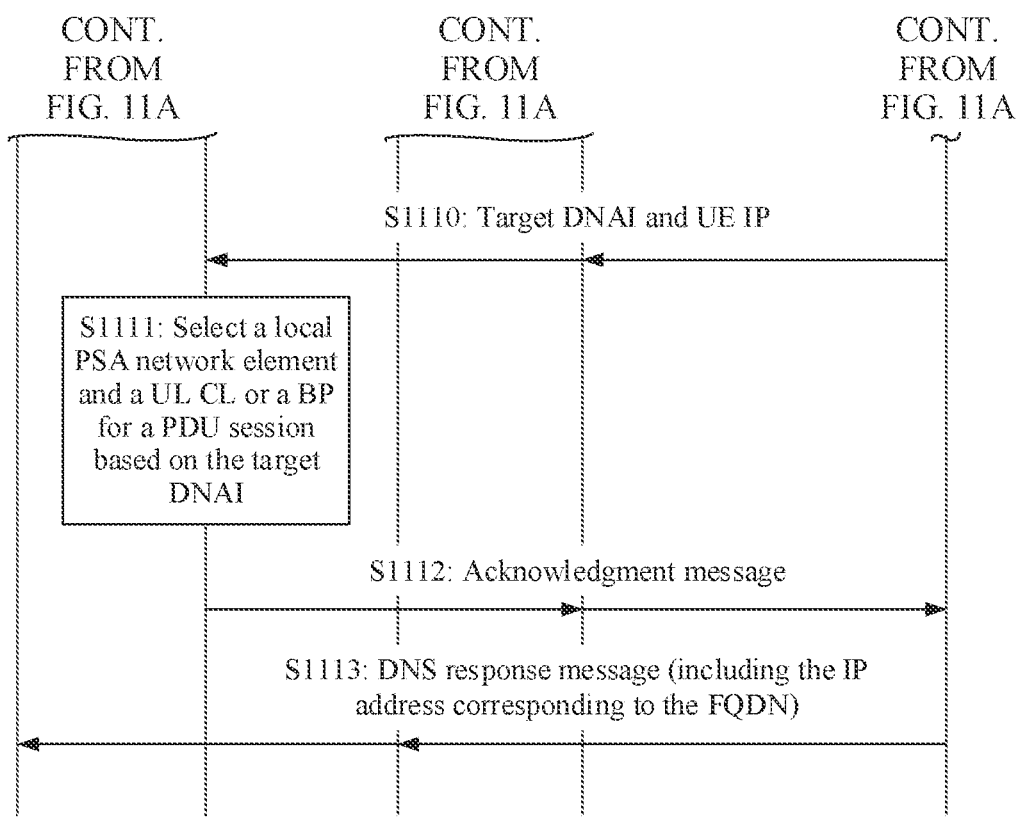

Embodiment 5: As shown in FIG. 11A and FIG. 11B, a first network element is a centralized DNS server. A correspondence among a domain name, an identifier of an application, and at least one DNAI respectively corresponding to at least one application platform on which each application is deployed and an IP address corresponding to each application platform are configured on the centralized DNS server. Each application platform is represented by a DNAI corresponding to the application platform. The centralized DNS server may obtain the configured content through an AF.

For details of S1101 to S1106, refer to S1001 to S1006, and repeated content is not described again.

S1107: The SMF network element determines a DNAI list.

Specifically, the SMF network element determines the DNAI list based on the APP ID, a current TAI of the UE, and at least one DNAI respectively corresponding to at least one application platform on which an application identified by the APP ID is deployed, where the DNAI list includes at least one DNAI.

S1108: The SMF sends a response message to the centralized DNS server through the NEF network element, where the response message carries the DNAI list and the UE IP.

S1109: The centralized DNS server determines, based on the DNAI list, an IP address corresponding to the FQDN and a target DNAI.

Specifically, the centralized DNS server determines, based on the DNAI list and the IP address corresponding to each application platform, an IP address corresponding to each DNAI in the DNAI list, to obtain an ECS option list. The ECS option list includes at least one ECS option respectively corresponding to the at least one DNAI, and each ECS option includes one IP address.

The centralized DNS server determines, based on the FQDN in the DNS query request and the ECS option list, an application platform to which the IP address in the ECS option points, and further determines an IP address of a server deployed on the application platform as the IP address corresponding to the FQDN. The server supports the FQDN in the DNS query request. After determining the application platform to which the IP address in the ECS option points, the centralized DNS server uses a DNAI of the application platform as the target DNAI.

If the ECS option list includes a plurality of ECS options, the centralized DNS server may select a target ECS option from the plurality of ECS options, and further determine, as the IP address corresponding to the FQDN, an IP address of a server deployed on an application platform corresponding to the target ECS option. The server supports the FQDN in the DNS query request. The centralized DNS server determines that a DNAI of the application platform to which the target ECS option points is referred to as the target DNAI.

For details of S1110 to S1113, refer to S1010 to S1013, and repeated content is not described again.

It should be noted that the centralized DNS server in Embodiment 5 may be replaced with an ARF.

In Embodiment 5, in a scenario in which the first network element is the centralized DNS server, and second information includes the DNAI list, when the UE accesses, by using the IP address returned by the first network element, the FQDN at a location indicated by the location information of the UE, the UE can access a local service nearby, and a service access latency can be reduced, to improve communication efficiency.

Figure 12A:
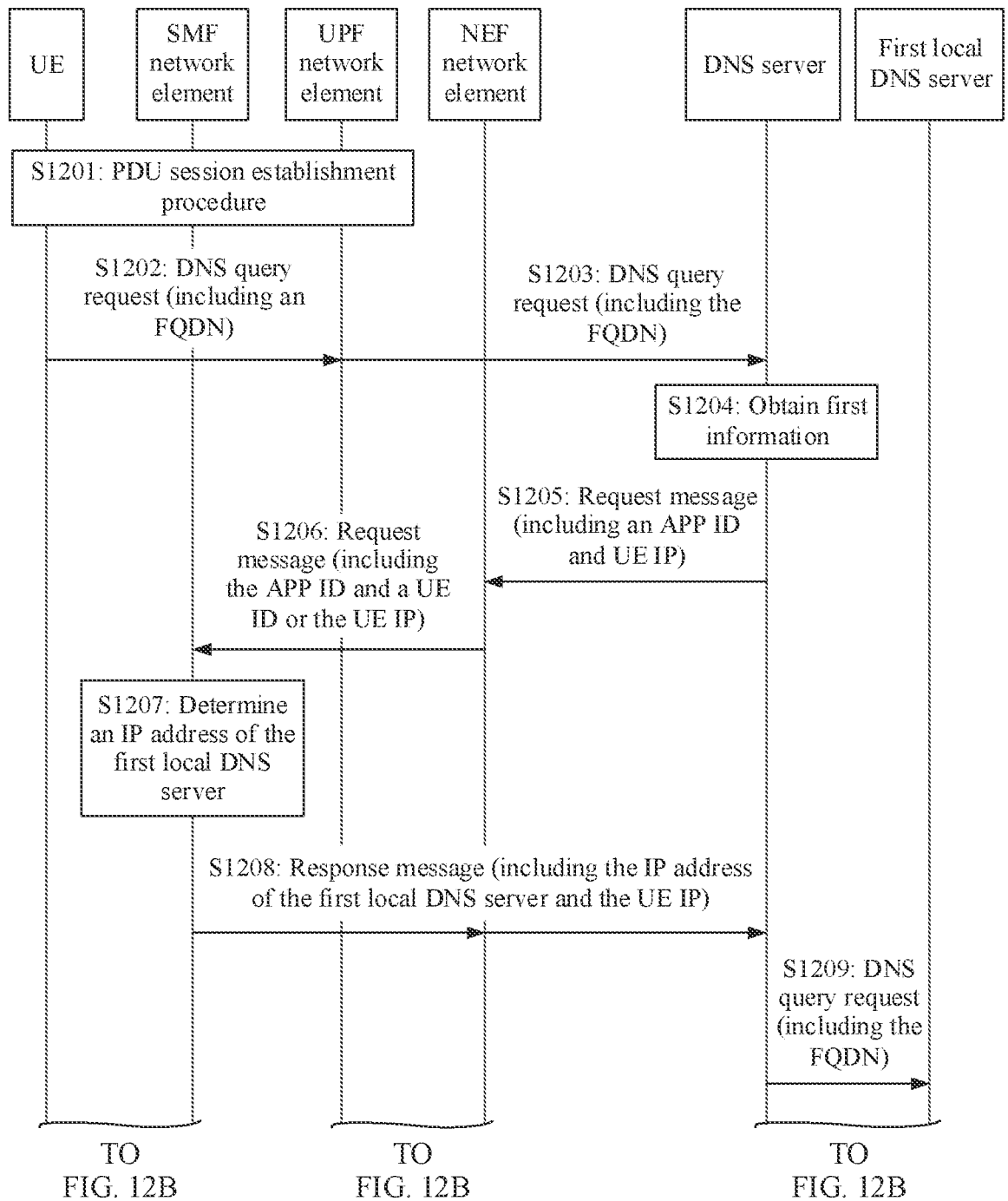
FIG. 12A and FIG. 12B are a sixth specific flowchart of requesting an IP address corresponding to a domain name by UE according to this application.
Figure 12B:
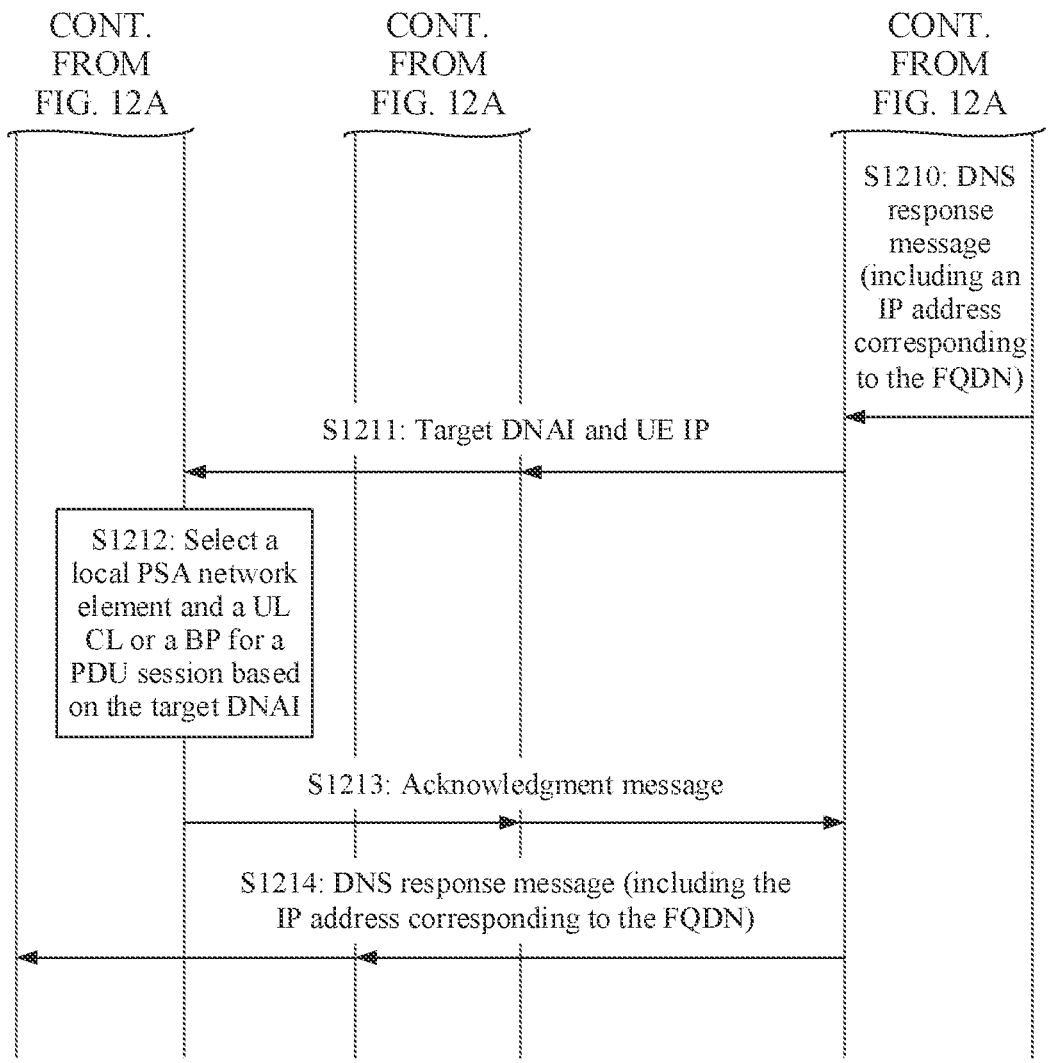

Embodiment 6: As shown in FIG. 12A and FIG. 12B, a first network element is a centralized DNS server. A correspondence among a domain name, an identifier of an application, and at least one DNAI respectively corresponding to at least one application platform on which each application is deployed and an IP address corresponding to each application platform are configured on the centralized DNS server. Each application platform is represented by a DNAI corresponding to the application platform. The centralized DNS server may obtain the configured content through an AF.

For details of S1201 to S1206, refer to S1001 to S1006, and repeated content is not described again.

S1207: The SMF network element determines an IP address of a first local DNS server.

Specifically, the SMF network element determines a DNAI list based on the APP ID, a current TAI of the UE, and at least one DNAI respectively corresponding to at least one application platform on which an application identified by the APP ID is deployed, where the DNAI list includes at least one DNAI.

The SMF network element further determines, based on the DNAI list and an IP address that is of a local DNS server and that corresponds to each application platform, an IP address that is of a local DNS server and that corresponds to each DNAI in the DNAI list. If the DNAI list includes one DNAI, an IP address that is of a local DNS server and that corresponds to the DNAI is used as the IP address of the first local DNS server. If the DNAI list includes a plurality of DNAIs, IP addresses of a plurality of local DNS servers are determined, and an IP address of a local DNS server is determined, as the IP address of the first local DNS server, in the IP addresses of the plurality of local DNS servers according to a local policy.

S1208: The SMF sends a response message to the centralized DNS server through the NEF network element, where the response message carries the IP address of the first local DNS server.

S1209: The centralized DNS server sends the DNS query request to the first local DNS server.

Specifically, the centralized DNS server may replace the destination address in the DNS query request with the IP address of the first local DNS server, and send the DNS query request to the first local DNS server.

S1210: The first local DNS server sends a DNS response message to the centralized DNS server, where the DNS response message carries an IP address corresponding to the FQDN.

Specifically, the first local DNS server determines, based on the FQDN in the DNS query request, an IP address of a server deployed on an application platform as the IP address corresponding to the FQDN. The server supports the FQDN in the DNS query request.

S1211: The centralized DNS server sends a target DNAI and the UE IP to the SMF network element through the NEF.

The centralized DNS server determines, based on the IP address that corresponds to the FQDN and that is carried in the DNS response message, a DNAI (referred to as the target DNAI) of the application platform on which the server to which the IP address points is deployed.

For example, a correspondence between an IP address space (or an IP address segment) and a DNAI of an application platform corresponding to the IP address space is locally configured on the centralized DNS server or is obtained from another network element. For example, the centralized DNS server may obtain the configured content through the AF. When obtaining the IP address corresponding to the FQDN, the centralized DNS server may determine an address space (or an IP address segment) to which the IP address belongs, and further determine a DNAI of an application platform corresponding to the address space (or the IP address segment).

S1212: The SMF network element selects a UL CL or a BP and a local PSA network element for the PDU session based on the target DNAI.

Specifically, the SMF network element determines the PDU session of the UE based on the UE IP, and selects the local PSA network element for the PDU session based on the target DNAI. Further, the SMF selects the UL CL or the BP for the PDU session based on the target DNAI, to implement local steering, optimize a service access path, and improve communication efficiency.

S1213: After performing S1011, the SMF network element sends an acknowledgment message to the centralized DNS server.

The acknowledgment message carries the UE IP.

S1214: The centralized DNS server sends a DNS response message to the UE through the anchor UPF, where the DNS response message carries the IP address corresponding to the FQDN.

It should be noted that the centralized DNS server in Embodiment 6 may be replaced with an ARF.

In Embodiment 6, in a scenario in which the first network element is the centralized DNS server, and second information includes the IP address of the first local DNS server, when the UE accesses, by using the IP address returned by the first network element, the FQDN at a location indicated by the location information of the UE, the UE can access a local service nearby, and a service access latency can be reduced, to improve the communication efficiency.

It may be understood that, in embodiments of this application, the session management function network element and/or the first network element may perform a part or all of the steps in embodiments of this application. These steps or operations are merely examples. In embodiments of this application, other operations or variants of various operations may be further performed. In addition, the steps may be performed in a sequence different from a sequence presented in embodiments of this application, and not all the operations in embodiments of this application may be necessarily performed.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In the foregoing embodiments provided in this application, various solutions of the application discovery method provided in embodiments of this application are separately described from perspectives of the network elements and interaction between the network elements. It may be understood that to implement the foregoing functions, each network element such as the session management function network element and the first network element includes a corresponding hardware structure and/or software module for performing each function. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
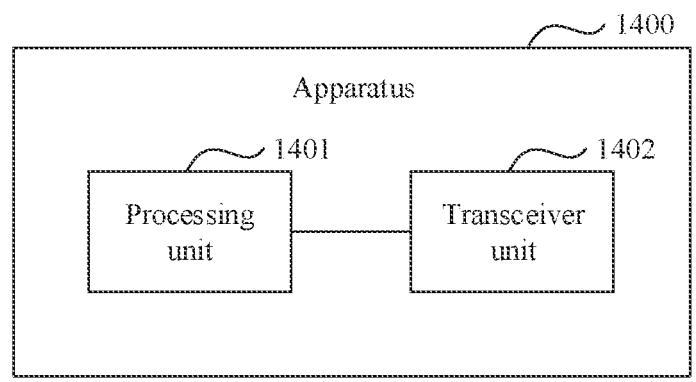
FIG. 14 is a first schematic diagram of a structure of an apparatus according to this application.

Same as the foregoing idea, as shown in FIG. 14, an embodiment of this application further provides an apparatus 1400. The apparatus 1400 includes a transceiver unit 1402 and a processing unit 1401.

In an example, the apparatus 1400 is configured to implement functions of the session management function network element in the foregoing methods. The apparatus may be a session management function network element.

The transceiver unit 1402 is configured to receive first information from a first network element, where the first information includes at least one of a first domain name or an identifier of a first application that corresponds to the first domain name, and the first domain name is sent by a terminal device.

The processing unit 1401 is configured to determine second information based on at least the first information and location information of the terminal device.

The transceiver unit 1402 is configured to send the second information to the first network element, where the second information is for obtaining a first IP address corresponding to the first domain name.

In an example, the apparatus 1400 is configured to implement functions of the first network element in the foregoing methods. The apparatus may be a first network element.

The processing unit 1401 is configured to obtain first information, where the first information includes at least one of a first domain name or an identifier of a first application that corresponds to the first domain name, and the first domain name is sent by a terminal device.

The transceiver unit 1402 is configured to send the first information to a session management function network element.

The transceiver unit 1402 is configured to receive second information from the session management function network element, where the second information is for obtaining a first IP address corresponding to the first domain name.

The transceiver unit 1402 is configured to send the first IP address to the terminal device.

For specific execution processes of the processing unit 1401 and the transceiver unit 1402, refer to the descriptions in the foregoing method embodiments. Division into modules in embodiments of this application is an example, is merely logical function division, and may be other division during actual implementation. In addition, functional modules in embodiments of this application may be integrated into one processor, each of the modules may exist alone physically, or two or more modules may be integrated into one module. The integrated module may be implemented by hardware, or may be implemented by a software functional module.

In another optional variant, the apparatus may be a chip system. In this embodiment of this application, the chip system may include a chip, or may include a chip and another discrete component. For example, the apparatus includes a processor and an interface, and the interface may be an input/output interface. The processor implements functions of the processing unit 1401, and the interface implements functions of the transceiver unit 1402. The apparatus may further include a memory. The memory is configured to store a program that may be run on the processor, and the processor implements the methods in the foregoing embodiments when executing the program.

Figure 15:
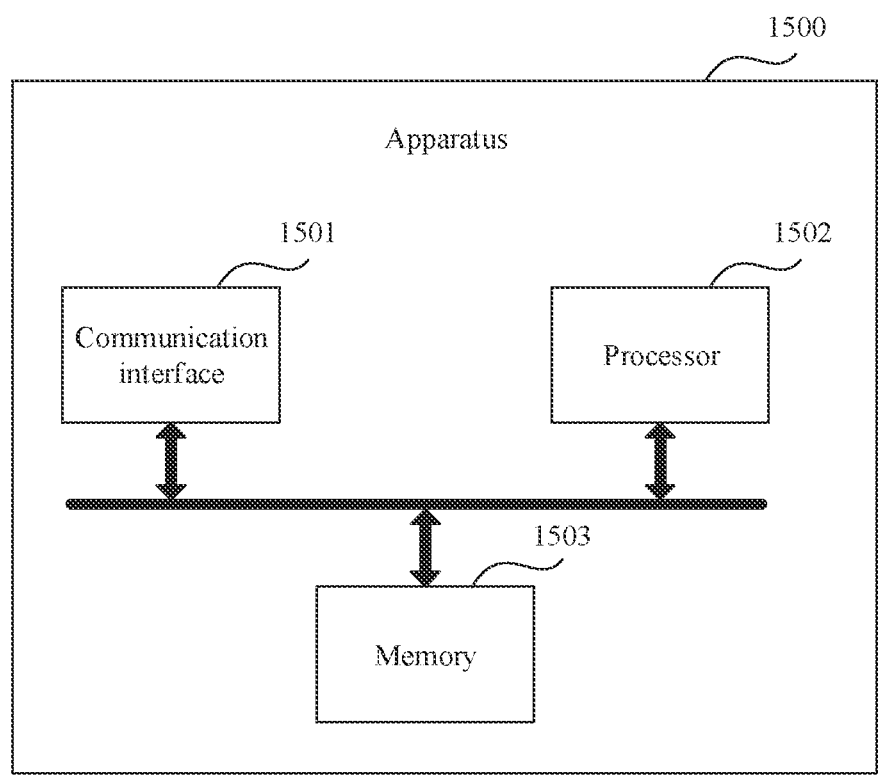
FIG. 15 is a second schematic diagram of a structure of an apparatus according to this application.

Same as the foregoing idea, as shown in FIG. 15, an embodiment of this application further provides an apparatus 1500. The apparatus 1500 includes a communication interface 1501, at least one processor 1502, and at least one memory 1503. The communication interface 1501 is configured to communicate with another device by using a transmission medium, so that an apparatus in the apparatus 1500 can communicate with the another device. The memory 1503 is configured to store a computer program. The processor 1502 invokes the computer program stored in the memory 1503, to send and receive data through the communication interface 1501, to implement the methods in the foregoing embodiments.

For example, when the apparatus is a session management function network element, the memory 1503 is configured to store a computer program, and the processor 1502 invokes the computer program stored in the memory 1503 to perform, through the communication interface 1501, the method performed by the session management function network element in the foregoing embodiments. When the apparatus is a first network element, the memory 1503 is configured to store a computer program, and the processor 1502 invokes the computer program stored in the memory 1503 to perform, through the communication interface 1501, the method performed by the first network element in the foregoing embodiments.

In this embodiment of this application, the communication interface 1501 may be a transceiver, a circuit, a bus, a module, or a communication interface of another type. The processor 1502 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps in the methods disclosed with reference to embodiments of this application may be directly performed by a hardware processor, or may be performed by a combination of hardware in the processor and a software module. The memory 1503 may be a non-volatile memory, for example, a hard disk drive (hard disk drive, HDD) or a solid-state drive (solid-state drive, SSD), or may be a volatile memory (volatile memory), for example, a random access memory (random access memory, RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function. The memory 1503 is coupled to the processor 1502. Coupling in this embodiment of this application is indirect coupling or a communication connection between apparatuses, units, or modules, may be in an electrical form, a mechanical form, or another form, and is used for information exchange between the apparatuses, units, or modules. In another implementation, the memory 1503 may alternatively be located outside the apparatus 1500. The processor 1502 may operate in collaboration with the memory 1503. The processor 1502 may execute program instructions stored in the memory 1503. At least one of the at least one memory 1503 may alternatively be included in the processor 1502. In this embodiment of this application, a connection medium among the communication interface 1501, the processor 1502, and the memory 1503 is not limited. For example, in this embodiment of this application, the memory 1503, the processor 1502, and the communication interface 1501 may be connected through a bus in FIG. 15. The bus may be classified into an address bus, a data bus, a control bus, or the like.

It may be understood that the apparatus in the embodiment shown in FIG. 14 may be implemented by the apparatus 1500 shown in FIG. 15. Specifically, the processing unit 1401 may be implemented by the processor 1502, and the transceiver unit 1402 may be implemented by the communication interface 1501.

An embodiment of this application further provides a computer-readable storage medium. The computer-readable storage medium stores a computer program. When the computer program is run on a device, the device is enabled to perform the methods in the foregoing embodiments.

An embodiment of this application further provides a communication system. The communication system includes a session management function network element and a first network element. The first network element may be any one of a DNS proxy, an address resolution function network element, or a centralized DNS server.

All or some of the methods in embodiments of this application may be implemented by using software, hardware, firmware, or any combination thereof. When software is for implementing the methods, all or some of the methods may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, a solid-state drive (Solid-State Drive, SSD)), or the like.

The foregoing embodiments are merely used to describe the technical solutions of this application in detail. The descriptions of the foregoing embodiments are merely intended to help understand the methods in embodiments of the present invention, and shall not be construed as any limitation on embodiments of the present invention. Variants or replacements readily figured out by a person skilled in the art shall fall within the protection scope of embodiments of the present invention.

What is claimed is:

1. A method, comprising:
   receiving, by a network element, a domain name system (DNS) query message from a terminal device;
   obtaining, by the network element, first information from the DNS query message, wherein the first information comprises a domain name, and the domain name is requested by the terminal device, and wherein the network element is an address resolution function network element;
   sending, by the network element, the first information to a session management function network element;
   receiving, by the session management function network element, the first information;
   determining, by the session management function network element, data network access identifier based on the first information and location information of the terminal device, wherein the data network access identifier is for indicating location information of a first application platform on which a first application is deployed, and the domain name corresponds to the first application;
   sending, by the session management function network element, second information related to the data network access identifier to the network element;
   receiving, by the network element, the second information from the session management function network element;
   adding, by the network element, the second information into the DNS query message to obtain a second DNS query message and sending the second DNS query message containing the second information to a central DNS server, wherein the second DNS query message is for obtaining an Internet Protocol (IP) address of an application server corresponding to the domain name;

receiving, by the network element, the IP address of the application server; and sending, by the network element, the IP address to the terminal device.

2. The method according to claim 1, wherein the determining, by the session management function network element, the data network access identifier based on the first information and location information of the terminal device comprises:

determining the first application platform in at least one application platform, by the session management function network element based on the first information, the location information of the terminal device, and location information of the at least one application platform on which the first application is deployed, wherein the data network access identifier corresponds to the first application platform.

3. The method according to claim 1, wherein the second information is an Extension Mechanisms for DNS Client Subnet option or an IP address of a local DNS server.

4. A communications system, comprising:

a first application discovery apparatus, comprising one or more first processors and one or more first memories coupled to the one or more first processors; and a second application discovery apparatus, comprising one or more second processors and one or more second memories coupled to the one or more second processors, and wherein the second application discovery apparatus is an address resolution function network element;

wherein the one or more second memories store second programming instructions for execution by the one or more second processors to:

receive a domain name system (DNS) query message from a terminal device;

obtain first information from the DNS query message, wherein the first information comprises a domain name, and the domain name is requested by the terminal device; and send the first information to the first application discovery apparatus;

wherein the one or more first memories store first programming instructions for execution by the one or more first processors to:

receive the first information from the second application discovery apparatus;

determine data network access identifier based on the first information and location information of the terminal device, wherein the data network access identifier is for indicating location information of a first application platform on which a first application is deployed, and the domain name corresponds to the first application; and send second information related to the data network access identifier to the second application discovery apparatus, wherein the second information is for obtaining an Internet Protocol (IP) address corresponding to the domain name;

and wherein the one or more second memories store second programming instructions for execution by the one or more second processors to:

receive the second information from the first application discovery apparatus;

add the second information into the DNS query message to obtain a second DNS query message and send the second DNS query message containing the second information to a central DNS server, wherein the second DNS query message is for obtaining an Internet Protocol (IP) address corresponding to an application server corresponding to the domain name;

receive the IP address of the application server; and send the IP address to the terminal device.

5. The communication system according to claim 4, wherein the one or more first memories store the first programming instructions for execution by the one or more first processors to:

determine, based on the first information, the location information of the terminal device, and location information of at least one application platform on which the first application is deployed, the first application platform in the at least one application platform, wherein the data network access identifier corresponds to the first application platform.

6. The communication system according to claim 4, wherein the second information is an Extension Mechanisms for DNS Client Subnet option or an IP address of a local DNS server.

* * * * *

UNITED STATES PATENT AND TRADEMARK OFFICE
CERTIFICATE OF CORRECTION

PATENT NO. : 12,149,499 B2
APPLICATION NO. : 17/896751
DATED : November 19, 2024
INVENTOR(S) : Fangyuan Zhu, Hui Ni and Yan Li It is certified that error appears in the above-identified patent and that said Letters Patent is hereby corrected as shown below:

In the Claims

In Column 36, In Line 12-14 (Approx.), In Claim 4, delete "apparatus, wherein the second information is for obtaining an Internet Protocol (IP) address corresponding to the domain name;" and insert -- apparatus; --.

Signed and Sealed this
Fourth Day of March, 2025

Coke Morgan Stewart
*Acting Director of the United States Patent and Trademark Office*